United States Patent
Tanaka et al.

(10) Patent No.: US 10,277,782 B2
(45) Date of Patent: Apr. 30, 2019

(54) COLOR CONVERSION TABLE GENERATION DEVICE, AND COLOR CONVERSION TABLE GENERATION METHOD

(71) Applicant: SEIKO EPSON CORPORATION, Tokyo (JP)

(72) Inventors: Katsuyuki Tanaka, Nagano (JP); Takashi Ito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/681,505

(22) Filed: Aug. 21, 2017

(65) Prior Publication Data
US 2018/0063382 A1    Mar. 1, 2018

(30) Foreign Application Priority Data
Aug. 30, 2016 (JP) .................................. 2016-167621

(51) Int. Cl.
*H04N 1/54* (2006.01)
*H04N 1/60* (2006.01)

(52) U.S. Cl.
CPC ............ *H04N 1/6025* (2013.01); *H04N 1/54* (2013.01); *H04N 1/603* (2013.01); *H04N 1/605* (2013.01); *H04N 1/6008* (2013.01); *H04N 1/6058* (2013.01)

(58) Field of Classification Search
CPC ...... H04N 1/54; H04N 1/6008; H04N 1/6025; H04N 1/603; H04N 1/605; H04N 1/6058
USPC ......................................................... 358/1.15
See application file for complete search history.

(56) References Cited

U.S. PATENT DOCUMENTS

| | | | | |
|---|---|---|---|---|
| 6,323,969 B1* | 11/2001 | Shimizu | ............... | H04N 1/6058 358/518 |
| 6,459,425 B1* | 10/2002 | Holub | ....................... | G01J 3/02 345/207 |
| 8,218,206 B2* | 7/2012 | Hori | ..................... | H04N 1/6058 358/1.9 |
| 2002/0060797 A1* | 5/2002 | Namikata | ............ | H04N 1/6022 358/1.9 |

(Continued)

FOREIGN PATENT DOCUMENTS

| | | |
|---|---|---|
| JP | 2010-245966 A | 10/2010 |
| JP | 2011-223392 A | 11/2011 |

(Continued)

*Primary Examiner* — Negussie Worku

(57) ABSTRACT

A color conversion table generation device, that generates a color conversion table defining a correspondence relationship between a coordinate value of input color space and a use amount of a plurality kinds of color materials, includes a boundary position setting unit that receives selection of setting of a boundary position at which use of a specific color material included in the plurality kinds of color materials is started or ended in a predefined axis provided in the input color space, a usability determination unit that determines whether the specific color material is to be used at a grid point defining the correspondence relationship or not, based on the boundary position in the predefined axis, and a use amount setting unit that sets a use amount of the specific color material at the grid point in a case where it is determined that the specific color material is to be used.

11 Claims, 21 Drawing Sheets

(56) References Cited

U.S. PATENT DOCUMENTS

| | | | |
|---|---|---|---|
| 2002/0122208 A1* | 9/2002 | Siegeritz | H04N 1/54 358/2.1 |
| 2003/0076516 A1* | 4/2003 | Saito | H04N 1/52 358/1.9 |
| 2008/0007784 A1* | 1/2008 | Tsuji | H04N 1/603 358/2.1 |
| 2011/0249280 A1 | 10/2011 | Ito | |
| 2013/0141764 A1* | 6/2013 | Nishikawa | H04N 1/6058 358/3.23 |
| 2014/0098387 A1* | 4/2014 | Chang | H04N 1/6058 358/1.9 |
| 2014/0318844 A1* | 10/2014 | Kim | H01G 2/06 174/260 |
| 2016/0080607 A1* | 3/2016 | Horita | H04N 1/6033 358/1.9 |
| 2016/0112603 A1* | 4/2016 | Mahy | H04N 1/6022 358/3.08 |
| 2018/0063382 A1 | 3/2018 | Tanaka et al. | |

FOREIGN PATENT DOCUMENTS

| | | |
|---|---|---|
| JP | 2012-129912 A | 7/2012 |
| JP | 2013-143718 A | 7/2013 |
| JP | 2015-142250 A | 8/2015 |
| JP | 2017-118234 A | 6/2017 |
| JP | 2018-037761 A | 3/2018 |

* cited by examiner

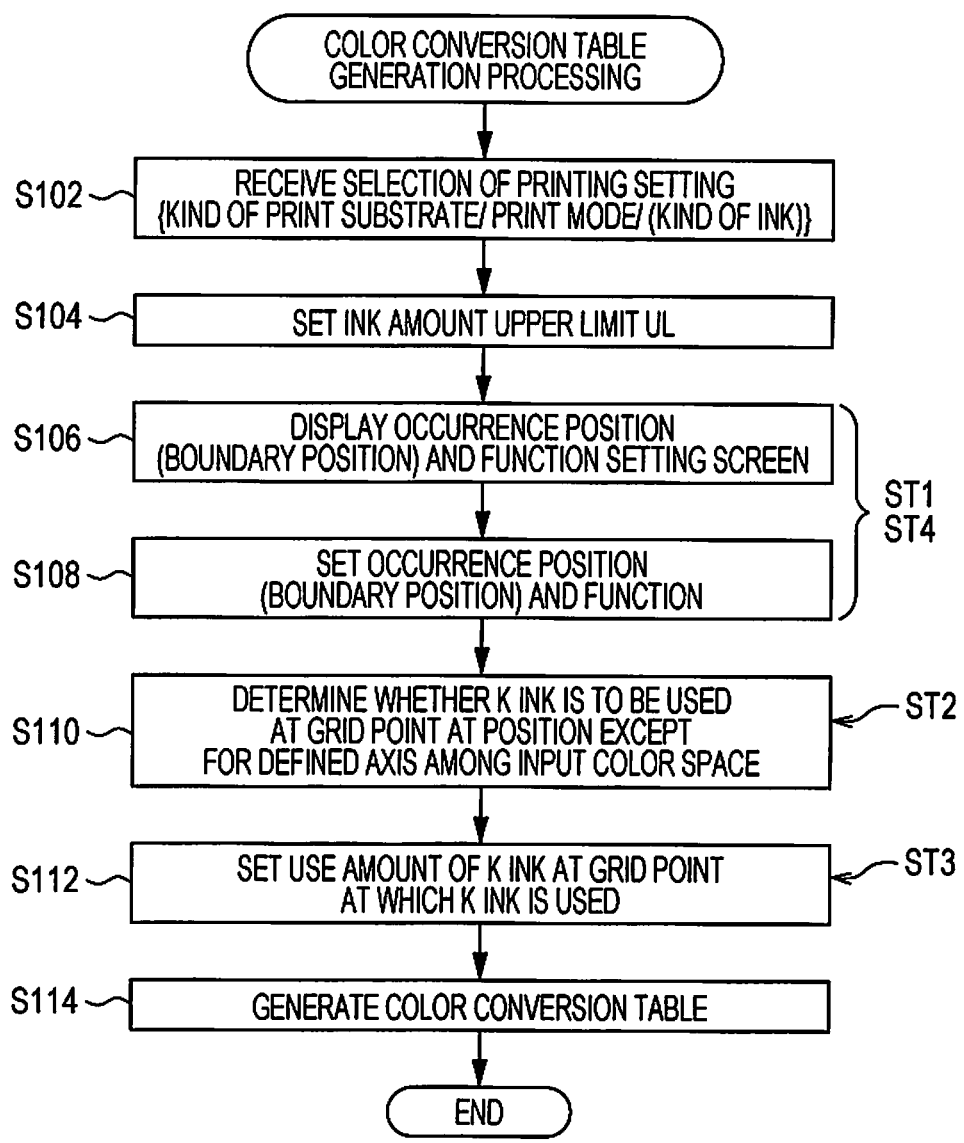

| | PRIMARY COLOR | SECONDARY COLOR | TOTAL |
|---|---|---|---|
| INK AMOUNT UPPER LIMIT UL | 100% | 120% | 120% |

| SET VALUE | 0 | 1 | 2 | 3 | 4 |
|---|---|---|---|---|---|
| GAIN | 3.0 | 4.0 | 5.0 | 6.0 | 7.0 |

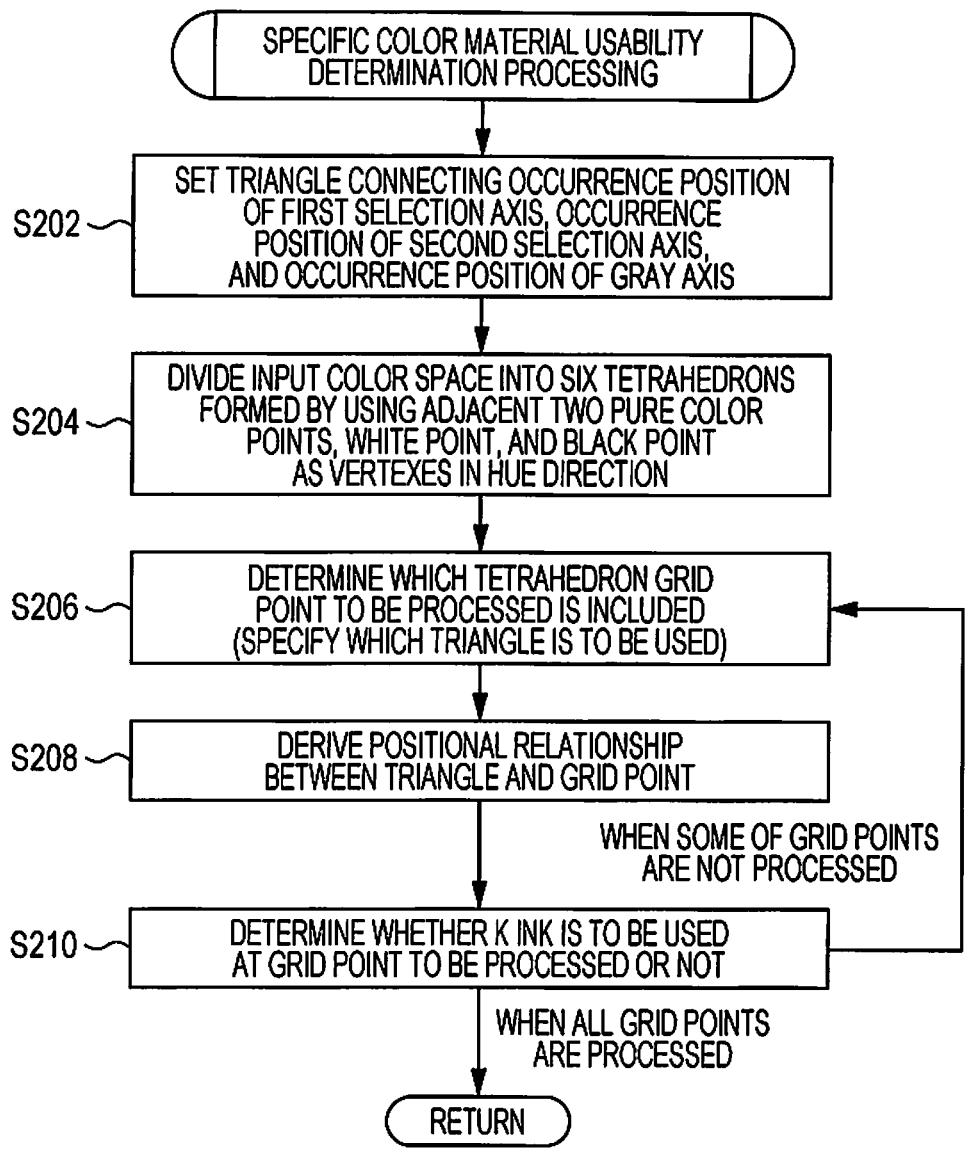

$$V_0 = \frac{V_a \cdot (V_b \times V_c)}{6}$$

$$P' = D + 1 \cdot nv_p$$

BUT $$1 = \frac{-(a \cdot C_C + b \cdot C_M + c \cdot C_Y + d)}{a \cdot nv_{pC} + b \cdot nv_{pM} + c \cdot nv_{pY}}$$

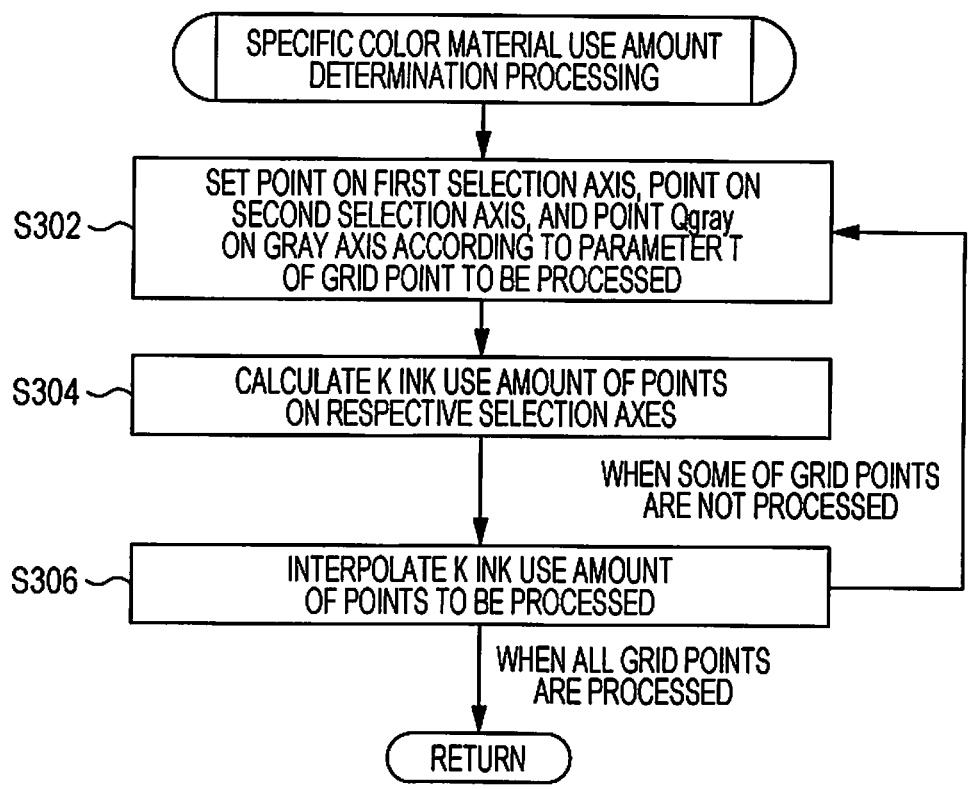

| INPUT VALUE | | | | DESIGNATION |
|---|---|---|---|---|
| C | M | Y | K | |
| 0% | 0% | 0% | 0% | W |
| 100% | 0% | 0% | 0% | C |
| 0% | 100% | 0% | 0% | M |
| 0% | 0% | 100% | 0% | Y |
| 0% | 100% | 100% | 0% | R |
| 100% | 0% | 100% | 0% | G |
| 100% | 100% | 0% | 0% | B |
| 100% | 100% | 100% | 0% | K |
| 0% | 0% | 0% | 100% | We |
| 100% | 0% | 0% | 100% | Ce |
| 0% | 100% | 0% | 100% | Me |
| 0% | 0% | 100% | 100% | Ye |
| 0% | 100% | 100% | 100% | Re |
| 100% | 0% | 100% | 100% | Ge |
| 100% | 100% | 0% | 100% | Be |
| 100% | 100% | 100% | 100% | Ke |

FIG. 19

$$p = \frac{K - (1-c)(1-m)(1-y)W_s + c(1-m)(1-y)C_s + (1-c)m(1-y)M_s + (1-c)(1-m)yY_s}{+(1-c)myR_s + c(m-1)yG_s + cm(1-y)B_s + cmyK_s}$$
$$\frac{(1-c)(1-m)(1-y)(W_e - W_s)}{+c(1-m)(1-y)(C_e - C_s) + (1-c)m(1-y)(M_e - M_s) + (1-c)(1-m)y(Y_e - Y_s)}$$
$$+(1-c)my(R_e - R_s) + c(m-1)y(G_e - G_s) + cm(1-y)(B_e - B_s) + cmy(K_e - K_s)$$

$\cdots (22)$

COLOR CONVERSION TABLE GENERATION DEVICE, AND COLOR CONVERSION TABLE GENERATION METHOD

BACKGROUND

1. Technical Field

The present invention relates to a technique for generating a color conversion table which defines a correspondence relationship between a coordinate value of input color space and a use amount of a plurality kinds of color materials.

2. Related Art

In order to convert an input color into a color of output color space depended on an ink jet printer, a color conversion table defining a correspondence relationship between a coordinate value of input color space and a use amount of a plurality kinds of ink is used. An ink set used in a printer includes, for example, C (cyan) ink, M (magenta) ink, Y (yellow) ink, and K (black) ink. Dots of K ink formed on a print substrate improve image quality in a case of reproducing a dark color, while the dots of K ink may cause a granular feeling in a case of reproducing a light color. Thus, the color conversion table is generated so that use of K ink is not allowed in an area for the light color of the input color space.

In the color conversion table, grid points representing positions in the input color space are set and the use amount of the plurality kinds of ink is correlated with the grid points. For example, in a case where input colors are three colors of R (red), G (green), and B (blue) and seventeen grid points are set in each of axial directions of R, G, and B, the number of grid points of the color conversion table becomes $17^3$ grid points.

Furthermore, as a reference example, a color conversion profile in which an ink use amount is selected so that a value of an object function, which includes the graininess index indicating graininess of ink dots, becomes less is described in JP-A-2012-129912.

When a color conversion table for obtaining a print image with high image quality by using ink of C, M, Y, and K is generated, for respective grid points, the use amount of ink of C, M, Y, and K needs to be determined after setting whether K ink is to be used or not while considering image quality of the print image. As described above, a lot of grid points are present in the color conversion table and thus, for respective grid points, when a user performs an operation for determining the ink use amount after setting whether K ink is to be used or not, it takes time.

Furthermore, the problem described above is not limited to a case of generating a color conversion table for an ink jet printer and also exist in a case of generating a color conversion table for reproducing an input color using various color materials.

SUMMARY

An advantage of some aspects of the invention is to provide a technique for easily generating a color conversion table which improves image quality of an output image.

According to an aspect of the invention, there is provided a color conversion table generation device that generates a color conversion table defining a correspondence relationship between a coordinate value of input color space and a use amount of a plurality kinds of color materials, the device including a boundary position setting unit that receives selection of setting of a boundary position at which use of a specific color material included in the plurality kinds of color materials is started or ended in a predefined axis provided in the input color space, a usability determination unit that determines whether the specific color material is to be used at a grid point defining the correspondence relationship or not, based on the boundary position in the predefined axis, and a use amount setting unit that sets a use amount of the specific color material at the grid point in a case where it is determined that the specific color material is to be used.

According to another aspect of the invention, there is provided a color conversion table generation method of generating a color conversion table defining a correspondence relationship between a coordinate value of input color space and a use amount of a plurality kinds of color materials, the method including receiving selection of setting of a boundary position at which use of a specific color material included in the plurality kinds of color materials is started or ended in a predefined axis provided in the input color space, determining whether the specific color material is to be used at a grid point defining the correspondence relationship or not, based on the boundary position in the predefined axis, and setting a use amount of the specific color material at the grid point in a case where it is determined that the specific color material is to be used.

Furthermore, according to still another aspect of the present invention, there is provided a color conversion table generation program for generating a color conversion table defining a correspondence relationship between a coordinate value of input color space and a use amount of a plurality kinds of color materials, the color conversion table generation program causes a computer to realize a boundary position setting function that receives selection of setting of a boundary position at which use of a specific color material included in the plurality kinds of color materials is started or ended in a predefined axis provided in the input color space, a usability determination function that determines whether the specific color material is to be used at a grid point defining the correspondence relationship or not, based on the boundary position in the predefined axis, and a use amount setting function that sets a use amount of the specific color material at the grid point in a case where it is determined that the specific color material is to be used.

According to the aspects, it is possible to provide a technique for easily generating a color conversion table which improves image quality of an output image.

BRIEF DESCRIPTION OF THE DRAWINGS

The invention will be described with reference to the accompanying drawings, wherein like numbers reference like elements.

FIG. 3 is a flowchart illustrating an example of color conversion table generation processing.

FIG. 8 is a flowchart illustrating an example of specific color material usability determination processing.

FIG. 11 is a flowchart illustrating an example of specific color material use amount determination processing.

FIG. 19 is a diagram illustrating an example of an expression obtaining a parameter p.

DESCRIPTION OF EXEMPLARY EMBODIMENTS

Figure 1:
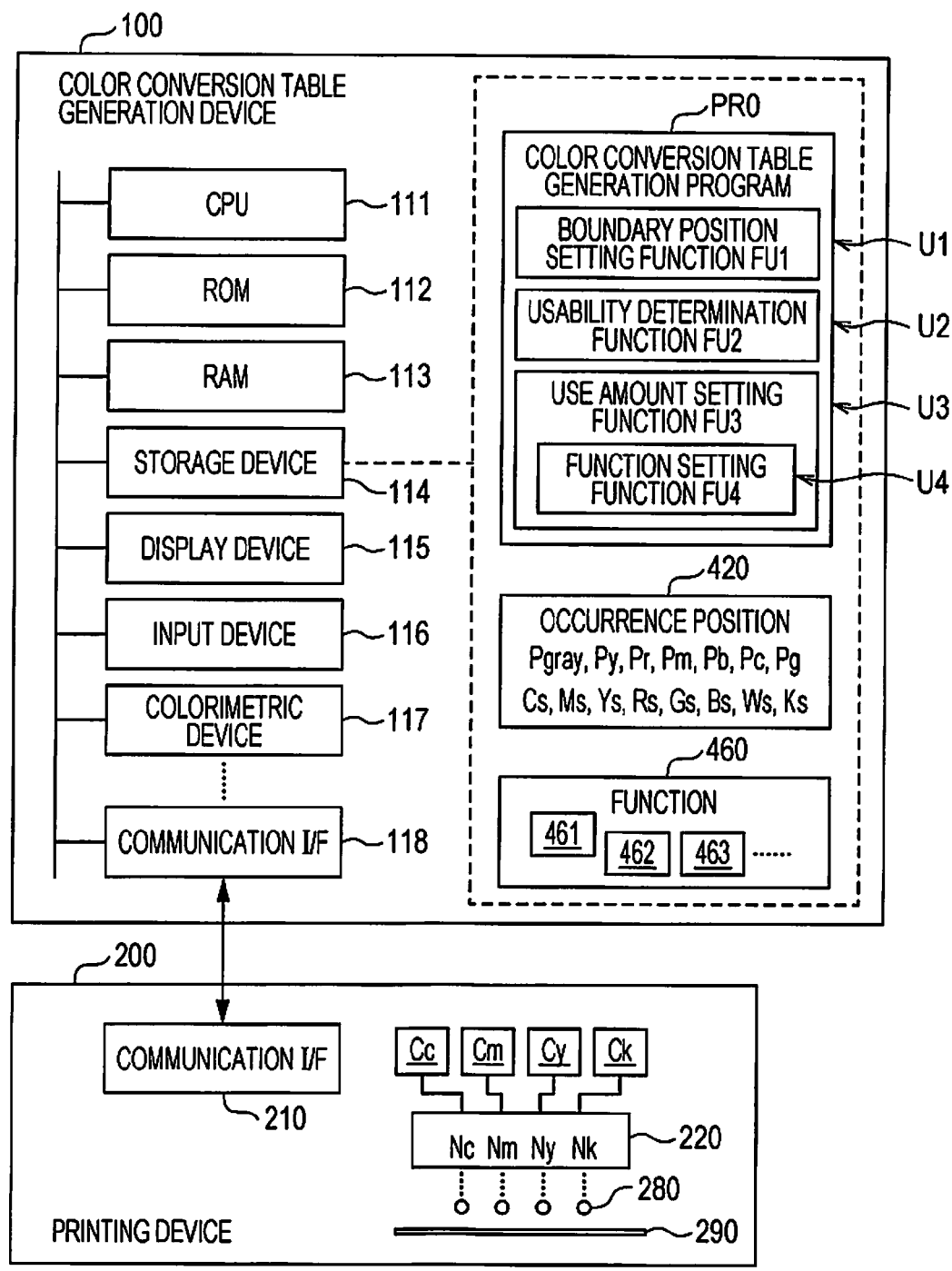
FIG. 1 is a block diagram schematically illustrating an example of a configuration of a color conversion table generation device.

In the following, embodiments of the present invention will be described. The following embodiments are just examples of the present invention and all features indicated in the embodiments do not become essential to solutions to the present invention.

1. OUTLINE OF PRESENT TECHNIQUE

First, an outline of a technique included in the present invention will be described with reference to examples illustrated in FIGS. 1 to 19. Also, figures of the present application are figures schematically illustrating the examples and a magnifying ratio in each direction illustrated in the figures may differ and respective figures may be inconsistent with each other.

Background

When a color conversion table is generated, a use amount of ink may need to be controlled. For example, in a case where a plurality of ink including at least CMYK (cyan, magenta, yellow, and black) is used, a use amount of K ink may be controlled in order to improve a granular feeling due to dots of relatively dark K ink.

As a known similar technique, there is a technique for controlling occurrence of K ink at the time of generating B to A data of the international color consortium (ICC) profile. However, this technique is a technique that uses a difference between the number of dimensions (four dimension) of CMYK color space which is input color space and the number of dimensions of (three dimension) of a color value space at the time of when preparing the ICC profile and is unable to be diverted to preparation of a color conversion table of which input color space is RGB (red, green, blue) color space.

Designating of the ink use amount in units of grid points by the user allows a very high controllability but the designating operation becomes complicated and thus, it is not realistic.

An advantage of the present technique is matters that reducing of effort and time by the user for setting occurrence of ink at the grid point and controllability which is practically effective can be achieved.

Furthermore, even when kinds of ink are different, there is no actual difference between algorithms that control the ink use amount and the method same as that described above can also be applied to any kind of ink.

Aspect 1

A color conversion table generation device 100 illustrated in FIGS. 1, 2A and 2B, 13, and 18 includes a boundary position setting unit U1, a usability determination unit U2, and a use amount setting unit U3 and generates a color conversion table 400 defining a correspondence relationship between coordinate values (Rj, Gj, and Bj in an example of FIG. 13) of input color space CS1 and a use amount (Cj, Mj, Yj, and Kj in an example of FIG. 13) of each of a plurality kinds of color materials (for example, ink of C, M, Y, and K). The boundary position setting unit U1 receives selection of setting of a boundary position (for example, occurrence position 420) at which use of a specific color material (for example, K ink) included in the plurality kinds of color materials is started or ended in a predefined axis A0 (see FIGS. 2B and 14A) provided in the input color space CS1. The usability determination unit U2 determines whether the specific color material is to be used at a grid point GD0 (for example, a grid point GD2 illustrated in FIGS. 10B and 17) defining the correspondence relationship, based on the boundary position ((420)) in the predefined axis A0. The use amount setting unit U3 sets a use amount of the specific color material at the grid point GD0 in a case where it is determined that the specific color material is to be used (see FIGS. 12A, 12B, and 17).

In the aspect 1, when the user sets the boundary position (420) at which use of the specific color material is started or ended in the predefined axis A0 provided in the input color space CS1, it is determined whether the specific color material is to be used at the grid point GD0 defining the correspondence relationship or not. With this, the user does not need to set whether the specific color material is to be used in all grid points GD0 or not. In a case where it is determined that the specific color material is to be used at the grid point GD0, a use amount of the specific color material in the grid point GD0 is set. Accordingly, in the aspect 1, it is possible to provide a color conversion table generation device that easily generates a color conversion table improving image quality of an output image.

Here, the input color space includes the RGB color space, the CMY (cyan, magenta, and yellow) color space, the CMYK color space, and the like.

The color material includes ink, toner, and the like.

In a case where the boundary position corresponds to a position where use of the specific color material is started, the specific color material includes a color material of K included in four color materials of CMYK, a color material of C or M included in four or more color materials of Lc (light cyan) having a lower concentration than C or Lm (light magenta) having a lower concentration than M, and CMY, a color material of Dy (dark yellow) included in four or more color materials of the Dy having a higher concentration than Y and CMY, a color material of K or Lk (light black) included in five or more color materials of the Lk having a lower concentration than K and CMYK, a color material of Or (orange) or Gr (green) included in four or more color materials of the Or or Gr and CMY, and the like. In a case where the boundary position corresponds to a position at which use of the specific color material is ended, the specific color material includes the color material of the Lc or Lm included in four or more color materials of the Lc or Lm and CMY, the color material of Y included in four or more color materials of the Dy and CMY, the color material of the Lk included in five or more color materials of the Lk and CMYK, and the like.

It is assumed that the grid point means a virtual point disposed on the input color space and an output coordinate value corresponding to a position of the grid point is stored in the grid point in the input color space. Matters that the plurality of grid points are unevenly distributed in the input color space as well as matters that a plurality of grid points are evenly distributed in the input color space are also included in a range of the present technique.

Aspect 2

Figure 12A:
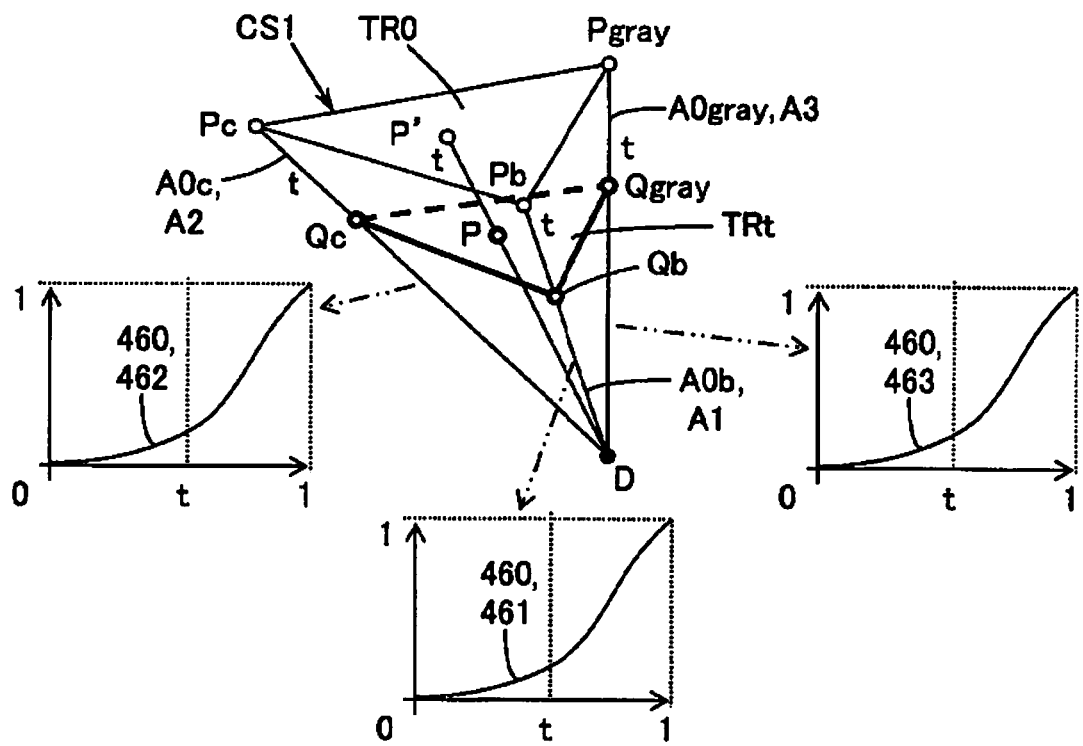
FIG. 12A is a diagram schematically illustrating an example of a way of setting a use amount of a specific color material at a position of the grid point of the input color space and FIG. 12B is a diagram schematically illustrating an example of a way of interpolating the use amount of the specific color material.
Figure 17:
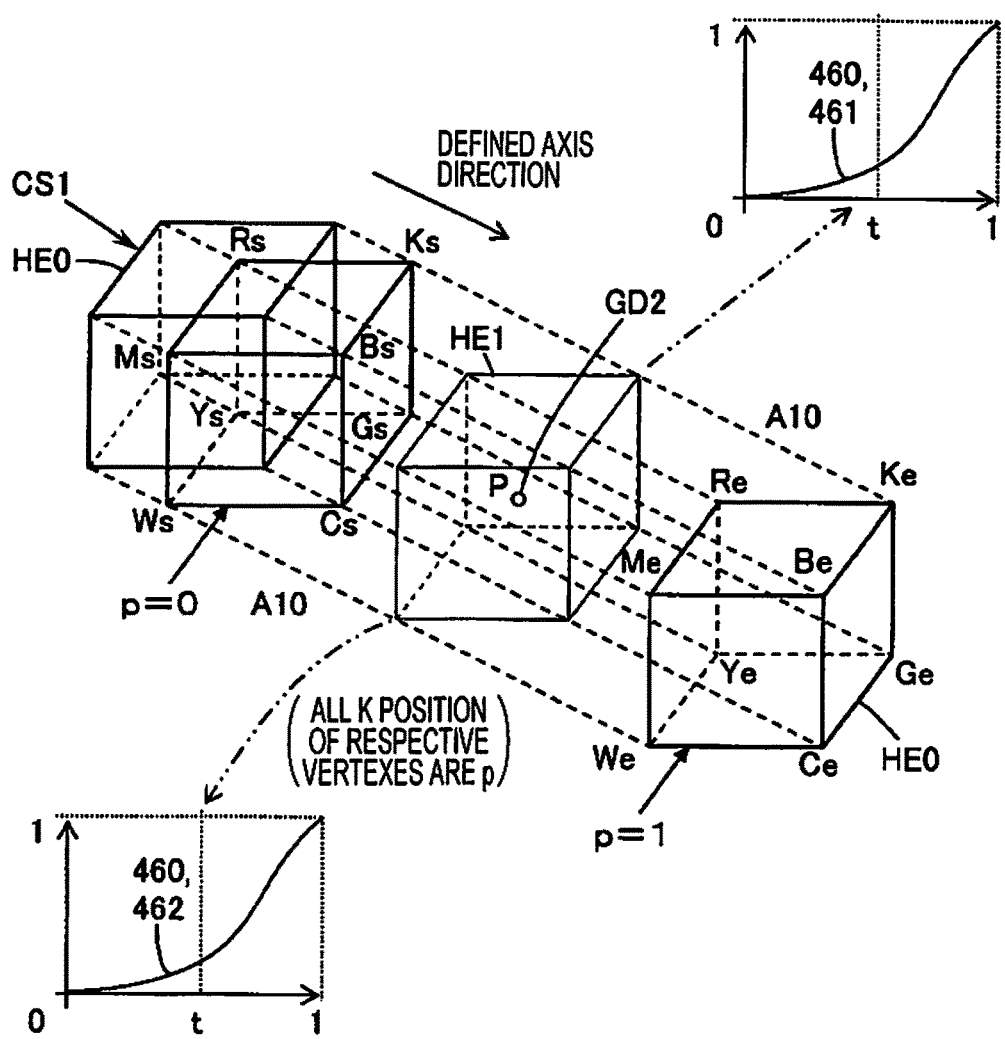
FIG. 17 is a diagram schematically illustrating an example of another way of setting the use amount of the specific color material at the position of the grid point of the four-dimensional input color space.

As illustrated in FIGS. 12A and 17, the use amount setting unit U3 may use a function 460 which obtains a value representing the use amount of the color material from a value representing a position of the predefined axis A0 to thereby set the use amount of the specific color material at the grid point GD0. With this, it is possible to easily set the use amount of the specific color material in the grid point GD0. That is, in the aspect 2, it is possible to provide a technique that easily generates a color conversion table improving image quality of an output image.

Aspect 3

Figure 6:
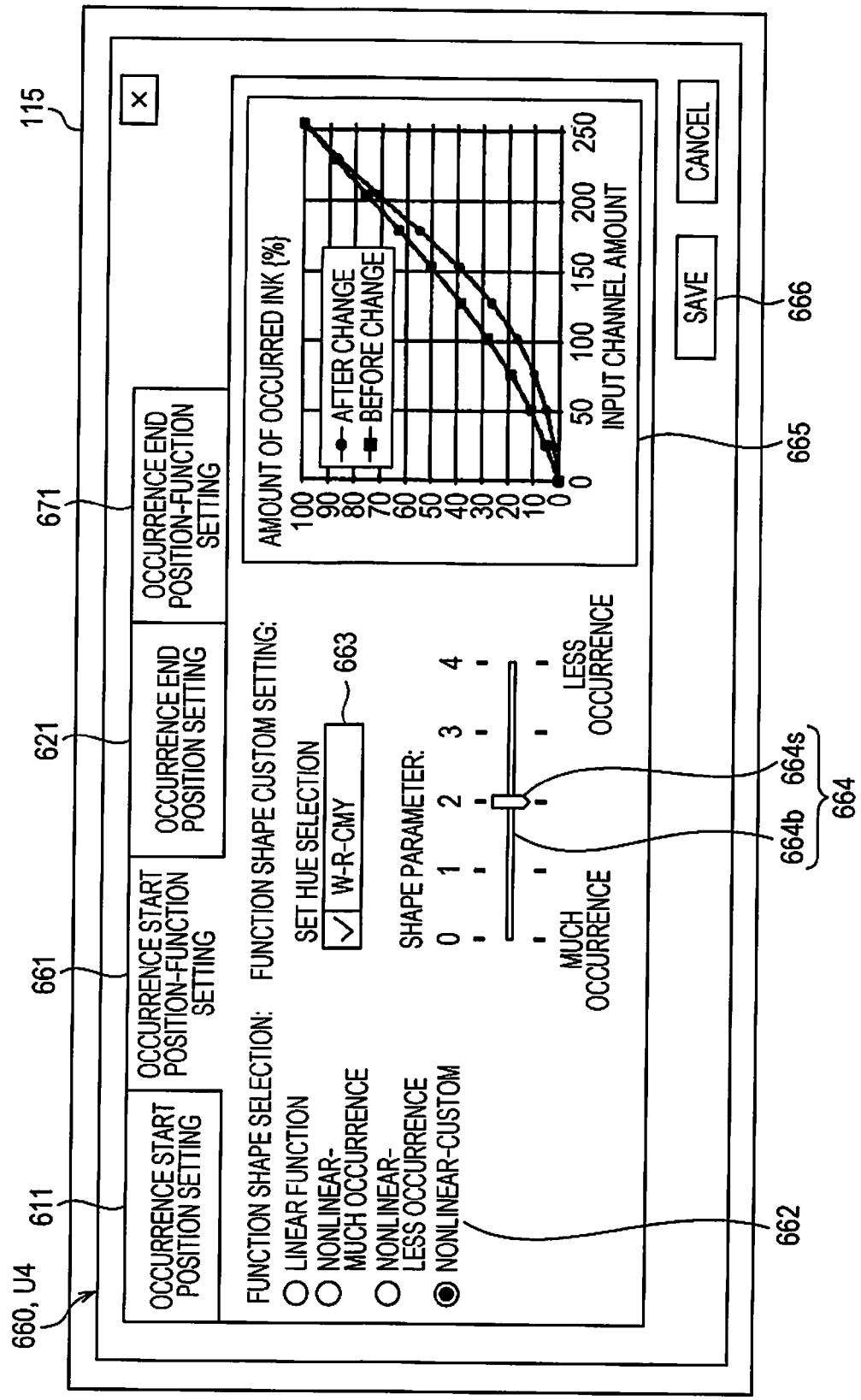
FIG. 6 is a diagram schematically illustrating an example of a function setting screen.
Figure 16:
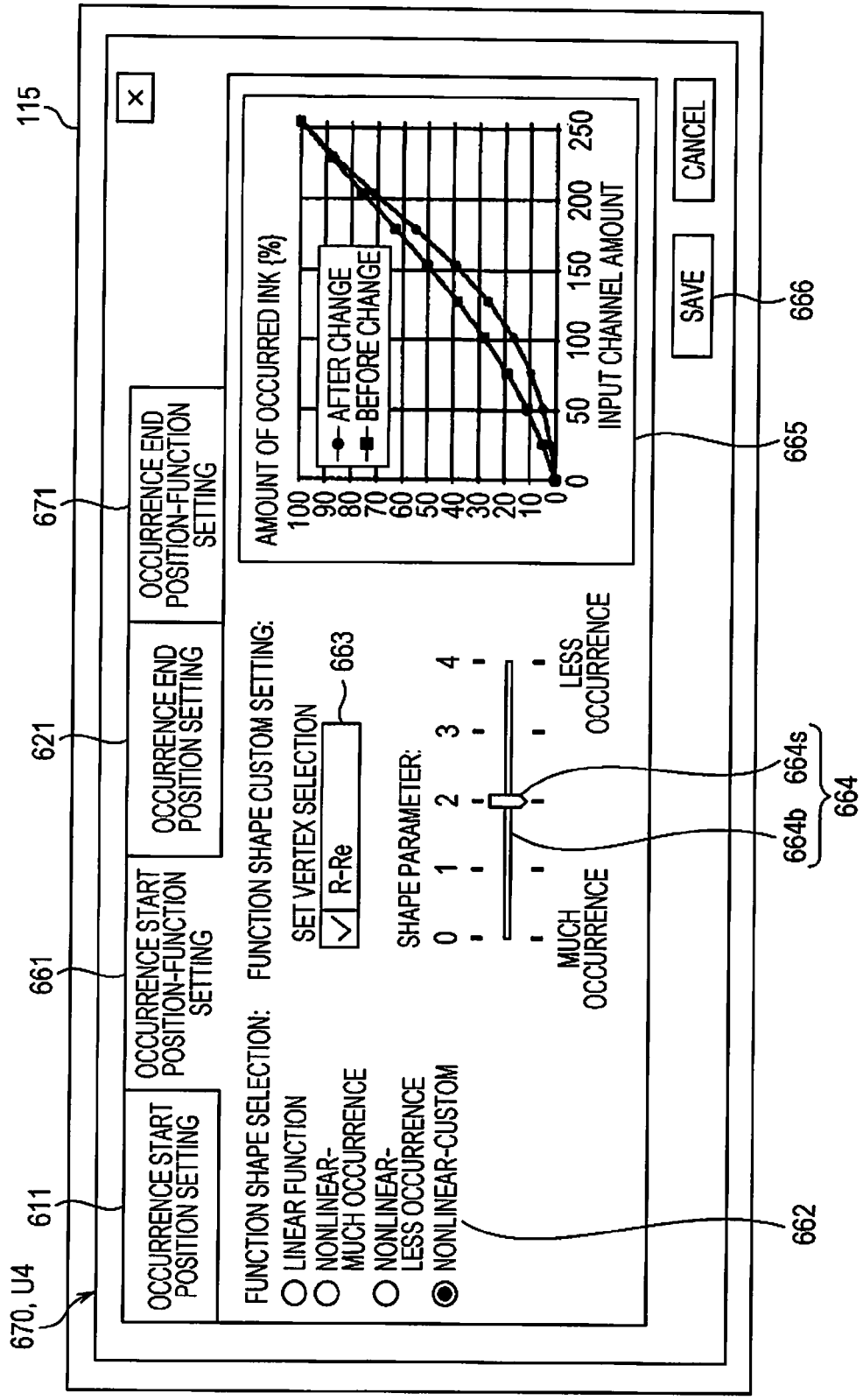
FIG. 16 is a diagram schematically illustrating an example of another function setting screen.

As illustrated in FIGS. 6 and 16, the use amount setting unit U3 may include a function setting unit U4 that receives setting of selection of the function 460 used in setting the use amount of the specific color material. With this, the user is able to set the use amount of the specific color material to a desired use amount at the grid point GD0. That is, in the aspect 3, it is possible to provide a technique that further easily generates a color conversion table improving image quality of an output image.

Aspect 4

Figure 2A:
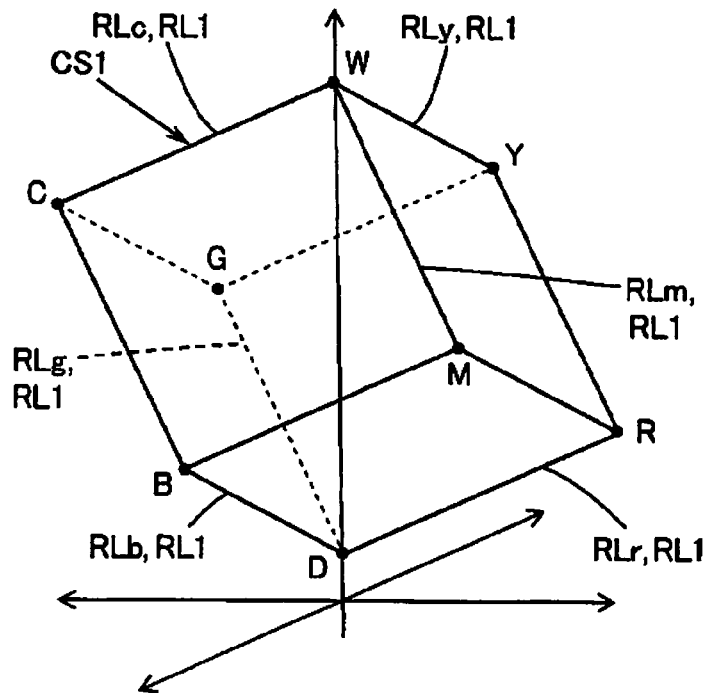
FIG. 2A is a diagram schematically illustrating an example of input color space as a cube and FIG. 2B is a diagram schematically illustrating the input color space illustrated in FIG. 2A by deforming the input color space into a hexagonal columnar shape as an example.
Figure 2B:
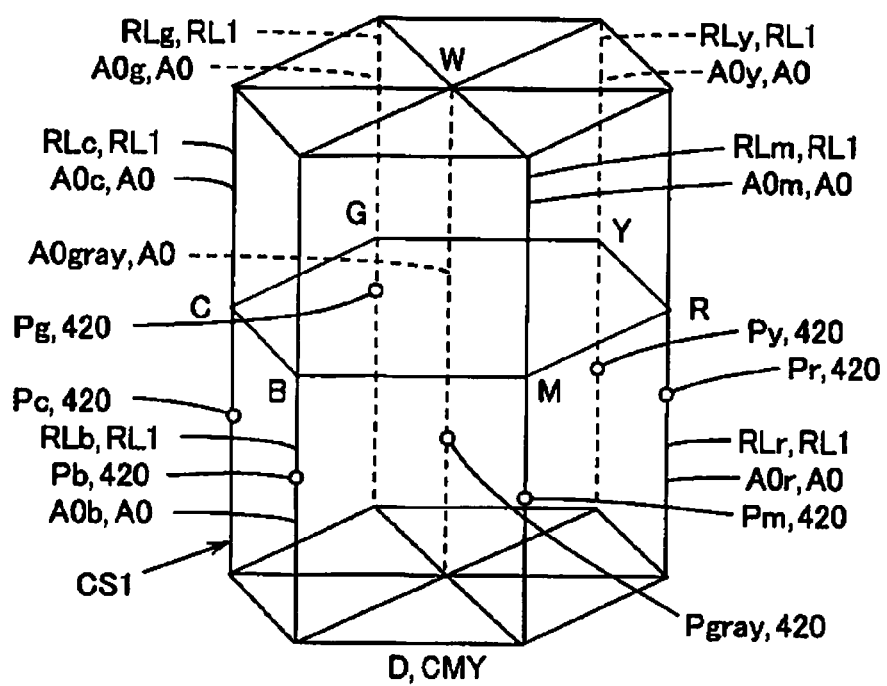

As illustrated in FIG. 2B, the predefined axis A0 may include a plurality of axes selected from a gray axis A0gray reaching a black point D from a white point W in the input color space CS1, an axis-via-Y A0y reaching the black point D by passing through a pure yellow color point Y from the white point W in the input color space CS1, an axis-via-R A0r reaching the black point D by passing through a pure red color point R from the white point W in the input color space CS1, an axis-via-M A0m reaching the black point D by passing through a pure magenta color point M from the white point W in the input color space CS1, an axis-via-B A0b reaching the black point D by passing through a pure blue color point B from the white point W in the input color space Cs1, an axis-via-C A0c reaching the black point D by passing through a pure cyan color point C from the white point W in the input color space CS1, and an axis-via-G A0g reaching the black point D by passing through a pure green color point G from the white point W in the input color space CS1. The boundary position setting unit U1 receives setting of the boundary position 420 for each of the plurality of axes. The usability determination unit U2 may determine whether the specific color material is to be used at the grid point GD0 or not, based on the boundary position 420 in each of the plurality of axes. The predefined axis A0 includes the plurality of axes to thereby make it possible to generate the color conversion table 400 improving image quality of an output image. That is, in the aspect 4, it is possible to provide a preferable technique that easily generates a color conversion table improving image quality of an output image.

Aspect 5

Figure 9A:
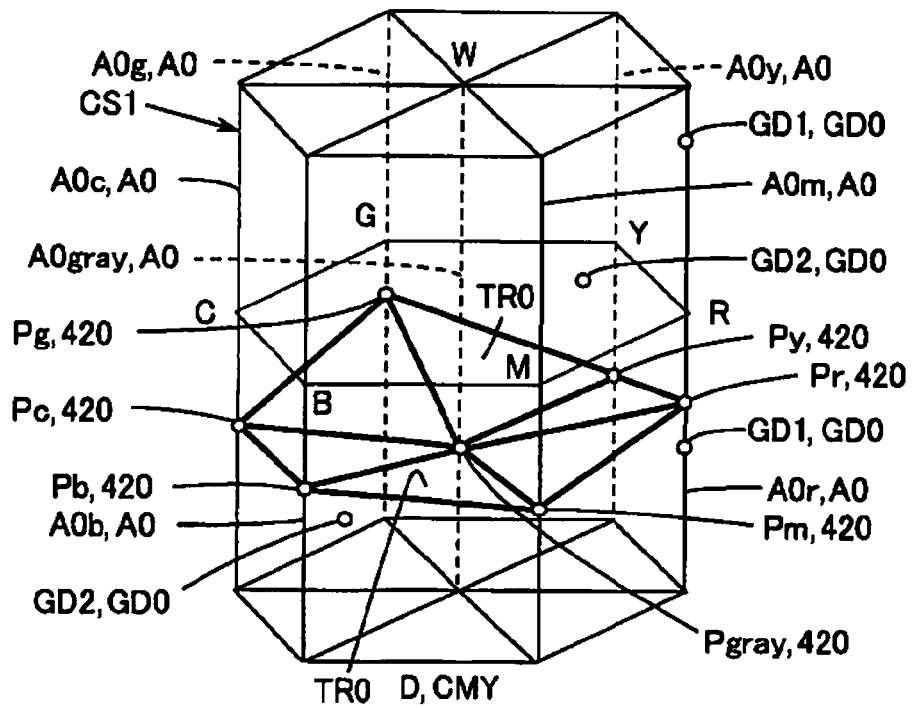
FIG. 9A is a diagram schematically illustrating an example in which a triangle connecting ink occurrence positions is set.

As illustrated in FIGS. 9A and 12A, the predefined axis A0 may include a first selection axis A1, a second selection axis A2, and a third selection axis A3 selected from among the gray axis A0gray, the axis-via-Y A0y, the axis-via-R A0r, the axis-via-M A0m, the axis-via-B A0b, the axis-via-C A0c, and the axis-via-G A0g. The usability determination unit U2 may determine whether the specific color material is to be used at the grid point GD0 or not, based on a positional relationship between a triangle TR0, which connects the boundary position (occurrence position Pb in FIG. 12A) in the first selection axis A1, the boundary position (occurrence position Pc in FIG. 12A) in the second selection axis A2, and the boundary position (occurrence position Pgray in FIG. 12A) in the third selection axis A3, and the grid point GD0, in the input color space CS1. In the aspect 5, it is possible to provide a preferable technique that easily generates a color conversion table improving image quality of an output image.

Aspect 6

Figure 10A:
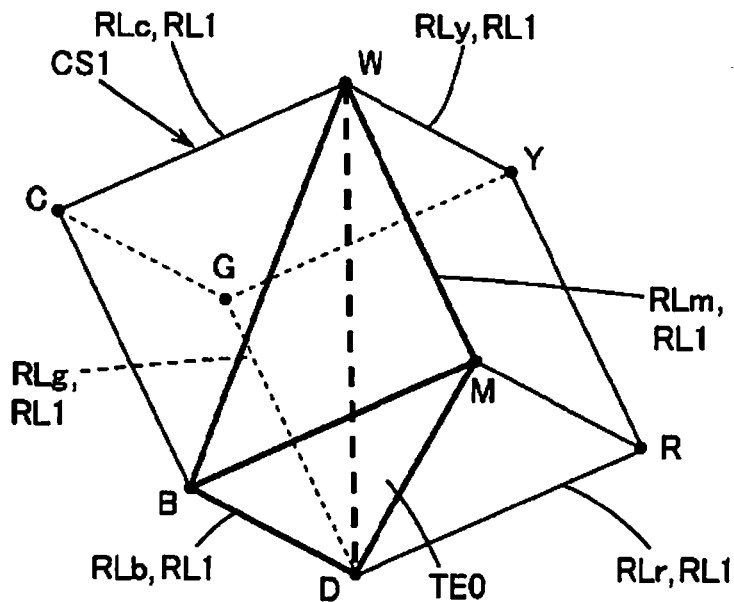
FIG. 10A is a diagram schematically illustrating an example in which a tetrahedron is set in the input color space.
Figure 10B:
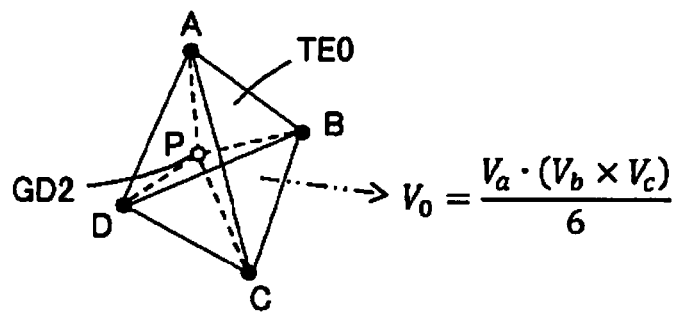
FIG. 10B is a schematic diagram for explaining an example of a way of determining whether a grid point is included in the tetrahedron or not.
Figure 10C:
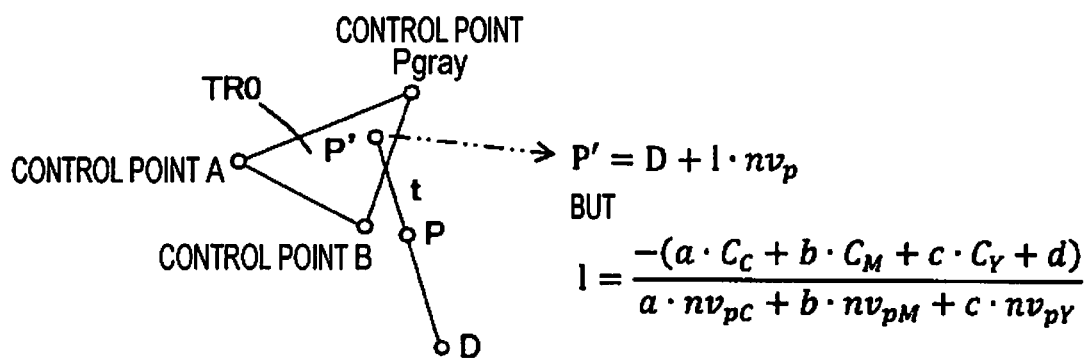
FIG. 10C is a schematic diagram for explaining an example of a way of determining whether a specific color material is to be used or not.

As illustrated in FIG. 12A, the third selection axis A3 may be the gray axis A0gray. As illustrated in FIGS. 10A to 10C, in a case where the usability determination unit U2 determines whether the grid point GD0 is included in a tetrahedron TE0, which is formed by using pure color points that the first selection axis A1 passes through, pure color points that the second selection axis A2 passes through, the white point W, and the black point D as vertices, in the input color space Cs1 or not and it is determined that the grid point GD0 is included in the tetrahedron TE0, the usability determination unit U2 may determine whether the specific color material is to be used at the grid point GD0 or not, based on a positional relationship between the triangle TR0 and the grid point GD0. In the aspect 6, it is possible to provide a further preferable technique that easily generates a color conversion table improving image quality of an output image.

Aspect 7

Figure 12B:
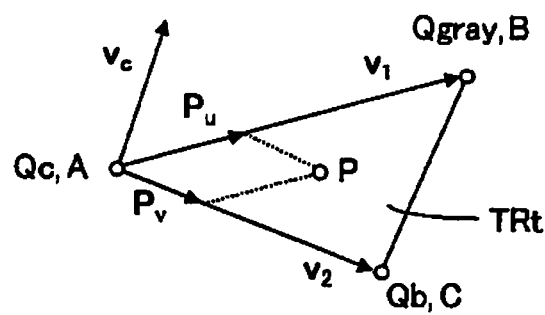

As illustrated in FIGS. 12A and 12B, the use amount setting unit U3 may set the use amount of the specific color material at the grid point GD0 in the input color space CS1, based on the positional relationship between the triangle TR0 and the grid point GD0. In the aspect 7, it is possible to provide a further preferable technique that easily generates a color conversion table improving image quality of an output image.

Aspect 8

Figures 14A, 14B:
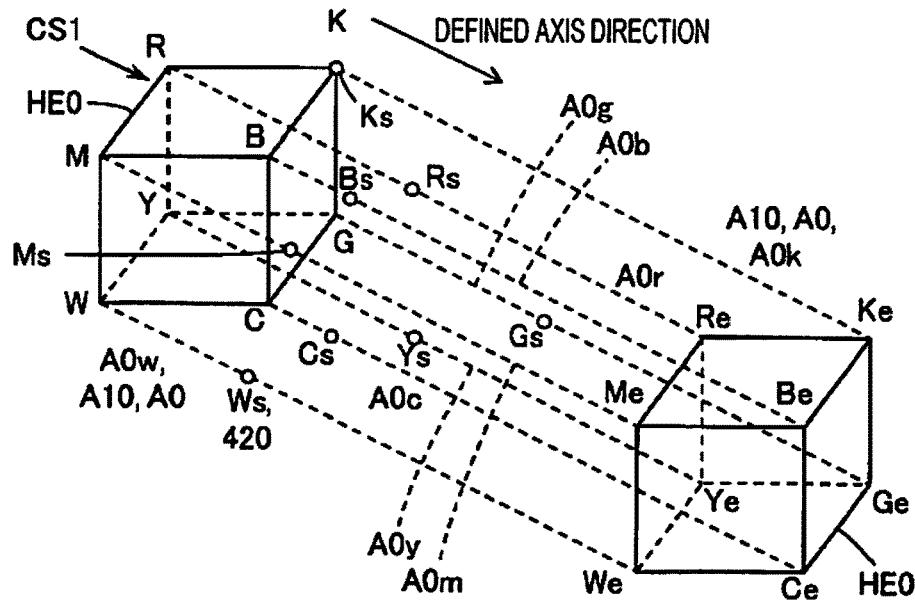
FIG. 14A is a diagram schematically illustrating an example of four-dimensional input color space and FIG. 14B is a diagram schematically illustrating an example of designations of respective vertices of the four-dimensional input color space.

As illustrated in FIG. 14A, the input color space CS1 may be color space (for example, CMYK color space) including a one-dimensional axis of a first input color (for example, C), a one-dimensional axis of a second input color (for example, M), a one-dimensional axis of a third input color (for example, Y), and a one-dimensional axis of a fourth input color (for example, K). The predefined axis A0 may include a plurality of ridgeline axes A10 each of which represents a locus when vertices of a virtual hexahedron HE0 configured with the one-dimensional axis of the first input color, the one-dimensional axis of the second input color, and the one-dimensional axis of the third input color are moved due to variation in components of the fourth input color, in the input color space CS1. The boundary position setting unit U1 may receive setting of the boundary position (420) for each of the plurality of ridgeline axis A10. The usability determination unit U2 may determine whether the specific color material is to be used at the grid point GD0 or not, based on the boundary position (420) in each of the plurality of ridgeline axis A10. The predefined axis A0 includes the plurality of ridgeline axes A10 to thereby make it possible to generate the color conversion table 400 so that the image quality of the output image is improved. That is, in the aspect 8, it is possible to provide a preferable technique that easily generates a color conversion table improving image quality of an output image.

Aspect 9

As illustrated in FIG. 14A, the predefined axis A0 may include eight ridgeline axes A10 corresponding to eight vertices, respectively, in the virtual hexahedron HE0. The usability determination unit U2 may determine whether the specific color material is to be used at the grid point GD0 in the input color space Cs1 or not, based on a positional relationship between the boundary position (420) at each of the eight ridgeline axes A10 and the grid point GD0. The predefined axis A0 includes eight ridgeline axes A10 to thereby make it possible to generate the color conversion table 400 so that the image quality of the output image is further improved. That is, in the aspect 9, it is possible to provide a preferable technique that easily generates a color conversion table improving image quality of an output image.

Aspect 10

As illustrated in FIG. 17, the use amount setting unit U3 may set the use amount of the specific color material at the grid point GD0 in the input color space CS1, based on the positional relationship between the boundary position (420) in each of the eight ridgeline axes A10 and the grid point GD0. In the aspect 10, it is possible to provide a preferable technique that easily generates a color conversion table improving image quality of an output image.

Aspect 11

A color conversion table generation method illustrated in FIGS. 2A and 2B, 13, and 18 includes a boundary position setting step ST1 corresponding to the boundary position setting unit U1, a usability determination step ST2 corresponding to the usability determination unit U2, and a use amount setting step ST3 corresponding to the use amount setting unit U3. In the aspect 11, it is possible to provide a color conversion table generation method that easily generates a color conversion table improving image quality of an output image. The color conversion table generation method may further include a function setting step ST4 corresponding to the function setting unit U4.

Aspect 12

A color conversion table generation program PRO illustrated in FIGS. 1, 2A and 2B, 13, and 18 causes a computer to realize a boundary position setting function FU1 corresponding to the boundary position setting unit U1, a usability determination function FU2 corresponding to the usability determination unit U2, and a use amount setting function FU3 corresponding to the use amount setting unit U3. In the aspect 12, it is possible to provide a color conversion table generation program PRO that easily generates a color conversion table improving image quality of an output image. The color conversion table generation program PRO may further causes the computer to realize a function setting function FU4 corresponding to the function setting unit U4.

Furthermore, the present technique may be applied to a composite apparatus including a color conversion table generation device, a control method of the color conversion table generation device, a control method of the composite apparatus, a control program of the color conversion table generation device, a control program of the composite apparatus, a color conversion table generation program, a computer readable medium having stored the control programs therein, or the like. The apparatuses may be configured with a plurality of distributed portions.

2. SPECIFIC EXAMPLE OF COLOR CONVERSION TABLE GENERATION DEVICE

Figure 13:
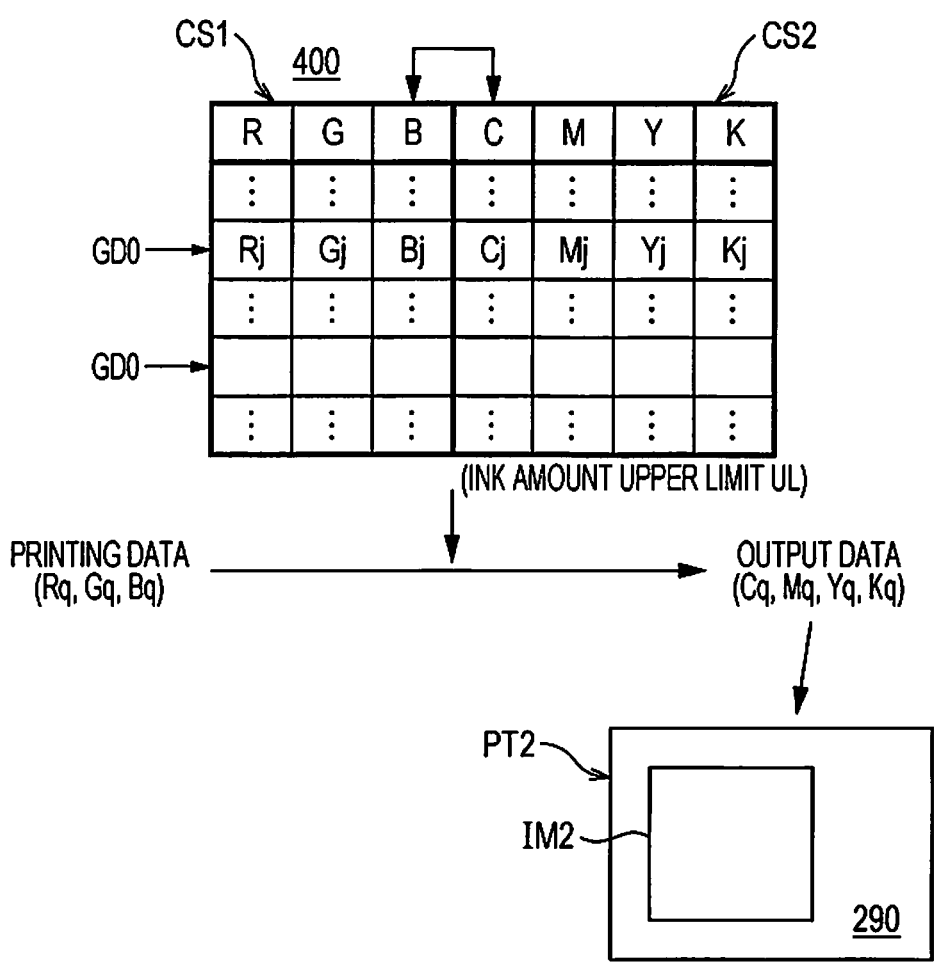
FIG. 13 is a diagram schematically illustrating an example of a color conversion table.

FIG. 1 schematically illustrates an example of a configuration of a color conversion table generation device. In the color conversion table generation device 100 illustrated in FIG. 1, a central processing unit (CPU) 111, a read only memory (ROM) 112, a random access memory (RAM) 113, a storage device 114, a display device 115, an input device 116, a colorimetric device 117, a communication I/F (interface) 118, and the like are connected so as to make it possible for information to be input and output between each other. The color conversion table generation device 100 of the present specific example generates the color conversion table 400 illustrated in FIGS. 13 and 18. For example, the color conversion table 400 illustrated in FIG. 13 is a look up table (LUT) in which a correspondence relationship between input values (Rj, Gj, and Bj) representing the amount of RGB (red, green, blue) and output values (Cj, Mj, Yj, and Kj) representing the use amount of ink (which is an example of a color material) of CMYK (cyan, magenta, yellow, and black) is defined for each grid point GD0. Here, the variable j is a variable identifying each grid point GD0. The input values (Rj, Gj, and Bj) and the output values (Cj, Mj, Yj, and Kj) can be represented by gradation value, for example, 256 gradations, $2^{16}$ gradations, or the like. The number of the grid points GD0 is $17^3=4913$ grid points in a case where each of R, G, and B is divided into seventeen stages and the number of the grid points GD0 is $32^3=32768$ grid points in a case where each of R, G, and B is divided into thirty-two stages and accordingly, the number of the grid points GD0 becomes a great deal of grid points. In a case where the input color space CS1 is four-dimensional space like the color conversion table 400 illustrated in FIG. 18, the number of the grid points GD0 is further increased.

The storage device 114 stores a color conversion table generation program PRO, an occurrence position (420) (which is an example of a boundary position) where use of K ink (which is an example of specific color material) is started, the function 460 obtaining a value which represents an ink use amount, or the like. Although details will be described later, occurrence positions Pgray, Py, Pr, Pm, Pb, Pc, Pg, Cs, Ms, Ys, Rs, Gs, Bs, Ws, and Ks are collectively referred to as the occurrence position (420) and functions 461, 462, and 463 are collectively referred to as the function 460. In the storage device 114, a nonvolatile semiconductor memory such as a flash memory, a magnetic storage device such as a hard disk, or the like can be used. In the display device 115, a liquid crystal display panel or the can be used. In the input device 116, a pointing device, hard keys including a key board, a touch panel attached on the display panel, or the like can be used. The colorimetric device 117 is able to measure a color of a patch for obtaining color development characteristics of an input device (for example, display device 115) or an output device (for example, printing device 200), or the like and output a colorimetric value. The patch is also called a color chart. The colorimetric value is a value representing, for example, lightness L* and chromaticity coordinates a* and b& in the International Commission on Illumination (CIE) L*a*b* color space. The colorimetric device 117 may be provided outside the color conversion table generation device 100. The color conversion table generation device 100 acquires a colorimetric value from the colorimetric device 117 and performs various processing. The communication I/F 118 is connected to a communication I/F 210 of a printing device 200 and inputs and outputs information for the printing device 200. As standards for the communication I/Fs 118 and 210, the universal serial bus (USB), short-range radio communication standards, or the like may be used. Communication between the communication I/Fs 118 and 210 may be communication made through a wireline or wirelessly, or network communication through the local area network (LAN), the Internet, or the like.

The color conversion table generation program PRO illustrated in FIG. 1 causes the color conversion table generation device 100 to realize the occurrence position setting function FU1, the usability determination function FU2, and the use amount setting function FU3 including the function setting function FU4.

In the color conversion table generation device 100, a computer such as a personal computer (including a tablet type terminal), or the like is included. Although the color conversion table generation device 100 may include all constitutional elements 111 to 118 within a single casing, the color conversion table generation device 100 may be configured with a plurality of devices divided to be capable of being communicated with each other. Even when the printing device is present in the color conversion table generation device 100, the present technique can be embodied, and the printing device itself having a printing function may perform color conversion table generation processing of the present technique.

Figures 4A, 4B:
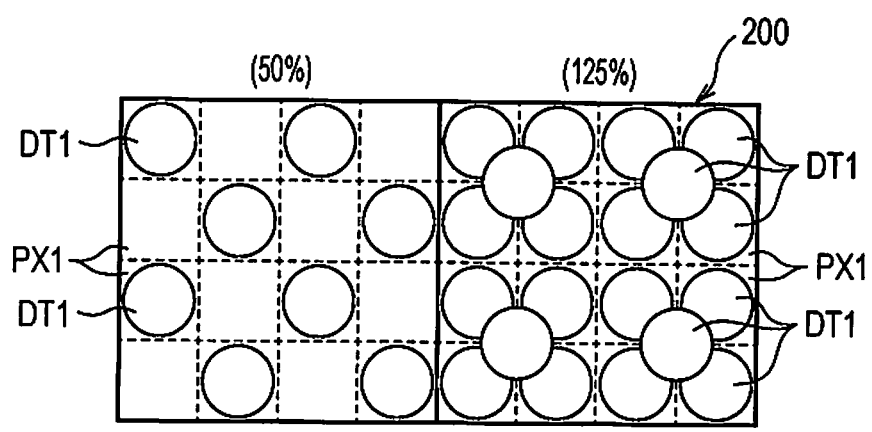
FIG. 4A is a diagram schematically illustrating an example of an ink ejection amount and FIG. 4B is a diagram schematically illustrating an example of ink amount upper limit.
Figure 18:
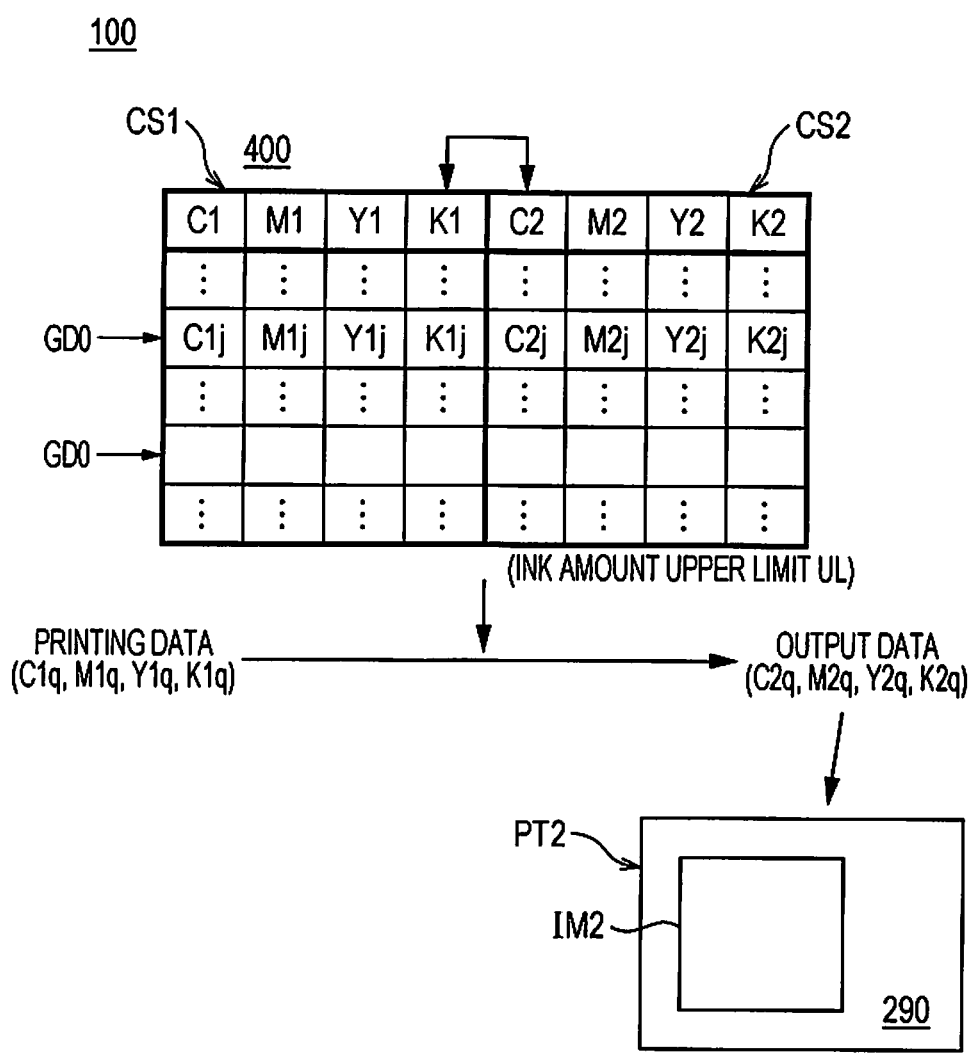
FIG. 18 is a diagram schematically illustrating an example of another color conversion table.

The printing device 200 illustrated in FIG. 1 is an ink jet printer which ejects (injects) CMYK ink from a recording head 220 to form a print image on a print substrate 290. The recording head 220 is supplied with C, M, Y, and K ink from ink cartridges Cc, Cm, Cy, and Ck, respectively, and ejects C, M, Y, and K ink droplets 280 from nozzles Nc, Nm, Ny, and Nk, respectively. When the ink droplets 280 are landed on the print substrate 290, ink dots DT1 are formed on the print substrate 290 as illustrated in FIG. 4A. As a result, a printed matter PT2 including a print image IM2 and illustrated in FIGS. 13 and 18 is obtained.

The printing device 200 obtains printing data based on an output image generated by the color conversion table generation device 100 and forms the print image corresponding to the output image on the print substrate based on the printing data. The printing device 200 may be equipped with a copier function, a facsimile function device, or the like.

3. DESCRIPTION OF INPUT COLOR SPACE IN FIRST SPECIFIC EXAMPLE

First, the specific input color space CS1 for obtaining the ink occurrence position (420) and the ink use amount will be described with reference to the example illustrated in FIGS. 2A and 2B.

The input color space CS1 of the first specific example is three-dimensional RGB color space. In FIG. 2A, a vertical axis schematically illustrates general lightness, two solid lines intersecting a lightness axis schematically illustrates general saturation, the three-dimensional input color space CS1 is schematically illustrated as a cube in such a schematic coordinates space. Eight vertices of W, D, Y, R, M, B, C, and G are set in the input color space CS1. Here, a vertex W indicates a white point having the highest brightness, a vertex D indicates a black point having the lowest lightness, a vertex Y indicates a pure yellow color point, a vertex R indicates a pure red color point, a vertex M indicates a pure magenta color point, a vertex B indicates a pure blue color point, a vertex C indicates a pure cyan color point, and a vertex G indicates a pure green color point. In FIG. 2A, a ridgeline RLy connecting the white point W and the pure yellow color point Y, a ridgeline RLr connecting the black point D and the a pure red color point R, a ridgeline RLm connecting the vertex W and the pure magenta color point M, a ridgeline RLb connecting the black point D and the pure blue color point B, a ridgeline RLc connecting the vertex W and the pure cyan color point C, and a ridgeline RLg connecting the black point D and the pure green color point G are illustrated. The ridgelines RLy, RLr, RLm, RLb, RLc, and RLg are collectively called a ridgeline RL1.

FIG. 2B schematically illustrates the input color space CS1 by expanding the white point W and the black point D of the input color space CS1 illustrated in FIG. 2A in a saturation direction and deforming the input color space CS1 into a hexagonal columnar shape. A predefined axis A0 to be used as a reference for setting the ink occurrence position (420) and the ink use amount is provided in the input color space CS1 having the hexagonal columnar shape. The predefined axis A0 illustrated in FIG. 2B includes the following (1) to (7) axes in the input color space CS1.

(1) a gray axis A0gray reaching the black point D from the white point W (2) an axis-via-Y A0y reaching the black point D by passing through the pure yellow color point Y from the white point W (axis passing through the surface of the input color space CS1 in the hue of yellow)

(3) an axis-via-R A0r reaching the black point D by passing through the pure red color point R from the white point W (axis passing through the surface of the input color space CS1 in the hue of red)

(4) an axis-via-M A0m reaching the black point D by passing through the pure magenta color point M from the white point W (axis passing through the surface of the input color space CS1 in the hue of magenta)

(5) an axis-via-B A0b reaching the black point D by passing through the pure blue color point B from the white point W (axis passing through the surface of the input color space CS1 in the hue of blue)

(6) an axis-via-C A0C reaching the black point D by passing through the pure cyan color point C from the white point W (axis passing through the surface of the input color space CS1 in the hue of cyan) and (7) an axis-via-G A0g reaching the black point D by passing through the pure green color point G from the white point W (axis passing through the surface of the input color space CS1 in the hue of green)

In FIG. 2B, ink occurrence positions Pgray, Py, Pr, Pm, Pb, Pc, and Pg that are respectively set in the axis A0gray, A0y, A0r, A0m, A0b, A0c, and A0g are also schematically illustrated.

The gray axis A0gray and representative axes of six hues are set in the predefined axis A0 to thereby make it possible to efficiently reduce work for setting the ink occurrence position (420) and the ink use amount. In this respect, although the seven axes described above are preferably set as the predefined axis A0, a plurality of axes selected from among the seven axes may be set in the predefined axis A0. That is, the predefined axis A0 is not limited to the seven axes and may include an axis other than the axis A0gray, A0y, A0r, A0m, A0b, A0c, and A0g described above.

In a case where an occurrence end position (an example of boundary position), at which use of the specific color material is ended by using the white point W as a base point, is set, the occurrence position (420) may be replaced by a reference to the occurrence end position.

4. COLOR CONVERSION TABLE GENERATION PROCESSING IN FIRST SPECIFIC EXAMPLE

FIG. 3 illustrates an example of color conversion table generation processing performed by the color conversion table generation device 100 illustrated in FIG. 1. Here, Steps S106 and S108 correspond to an occurrence position setting unit U1, a function setting unit U4, an occurrence position setting step ST1, a function setting step ST4, an occurrence position setting function FU1, and a function setting function FU4, Step S110 corresponds to a usability determination unit U2, a usability determination step ST2, and a usability determination function FU2, and Step S112 corresponds to a use amount setting unit U3, a use amount setting step ST3, and a use amount setting function FU3. In the following, description of a word "Step" will be omitted. Processing order of respective Steps S102 to S114 is not limited to order illustrated in FIG. 3.

When processing is started, the color conversion table generation device 100 receives selection of printing setting that affects image quality of a print image (S102). The printing setting includes a kind of print substrate or a print mode (for example, print resolution or recording method), and may include a kind of ink, or the like. Processing of S102 can be, for example, processing which receives printing setting of an item selected when the user operates the input device 116 and selects one item from among a plurality of items for printing setting.

Subsequently, in S104, an ink amount upper limit UL representing an upper limit of an ink amount capable being output per a unit area is set.

First, a concept of an ink ejection amount will be described with reference to FIG. 4A. FIG. 4A schematically illustrates an example of a state in which ink dots DT1 are formed on the print substrate 290. The ink ejection amount is also called an ink duty and represents an amount of ink ejected per a unit area of a print substrate. Here, the ink ejection amount is defined as (Ndt/Npx)×100% by defining a unit of formation of the ink dots DT1 is as a pixel PX1 and setting the number of dots each of which has the maximum size and formed on Npx pixels (Npx is an integer of two or more) as an Ndt (Ndt is an integer of zero or more). For example, as illustrated in the left side of FIG. 4A, in a case where Ndt=Npx/2 dots DT1 are formed on the Npx pixels, the ink ejection amount becomes 50%. In a case where a plurality of kinds of ink are used, ink dots of two colors or more are superposed to thereby make it possible for the ink ejection amount to be larger than 100%. For example, as illustrated in the right side of FIG. 4A, in a case where Npx/4 dots (for example, M dots) in addition to Npx dots (for example, C dots) are formed on the Npx pixel, the ink ejection amount becomes 125%. Furthermore, in a case where dots having a size smaller than the maximum size are formed, the dots having the small size may be converted into the dots having the maximum size by a conversion ratio according to a weight ratio of the ink droplets forming the dots to calculate the ink ejection amount.

When the ink ejection amount is made large, color reproducibility of the print image is likely to be increased but blurring of the ink dots or waving of a print substrate is likely to occur. Accordingly, the ink amount upper limit UL is set and the ink ejection amount is controlled.

FIG. 4B schematically illustrates an example of the ink amount upper limit UL. Here, a "primary color" means an ink amount upper limit in a case where only one kind of ink is used and means that when the ink amount upper limit of the "primary color" is Q %, a percentage (Nmax/Npx)×100% of the maximum number (which is set as Nmax) of dots of use ink (one kind) to the Npx pixels (unit area) is Q %. A "secondary color" means an ink amount upper limit in a case where two kinds of ink are used and means that when the ink amount upper limit of the "secondary color" is Q %, a percentage (Nmax/Npx)×100% of the maximum number Nmax of dots of use ink (two kinds) to the Npx pixels is Q %. A "Total" means an ink amount upper limit in a case where three kinds of ink are used and means that when the ink amount upper limit of the "Total" is Q %, a percentage (Nmax/Npx)×100% of the maximum number Nmax of dots of use ink (three kinds) to the Npx pixels is Q %.

After the ink amount upper limit UL is set, the color conversion table generation device 100 displays the occurrence position and the function setting screen on the display device 115 (S106) and sets the ink occurrence position (420) and the function 460 (S108).

Figure 5:
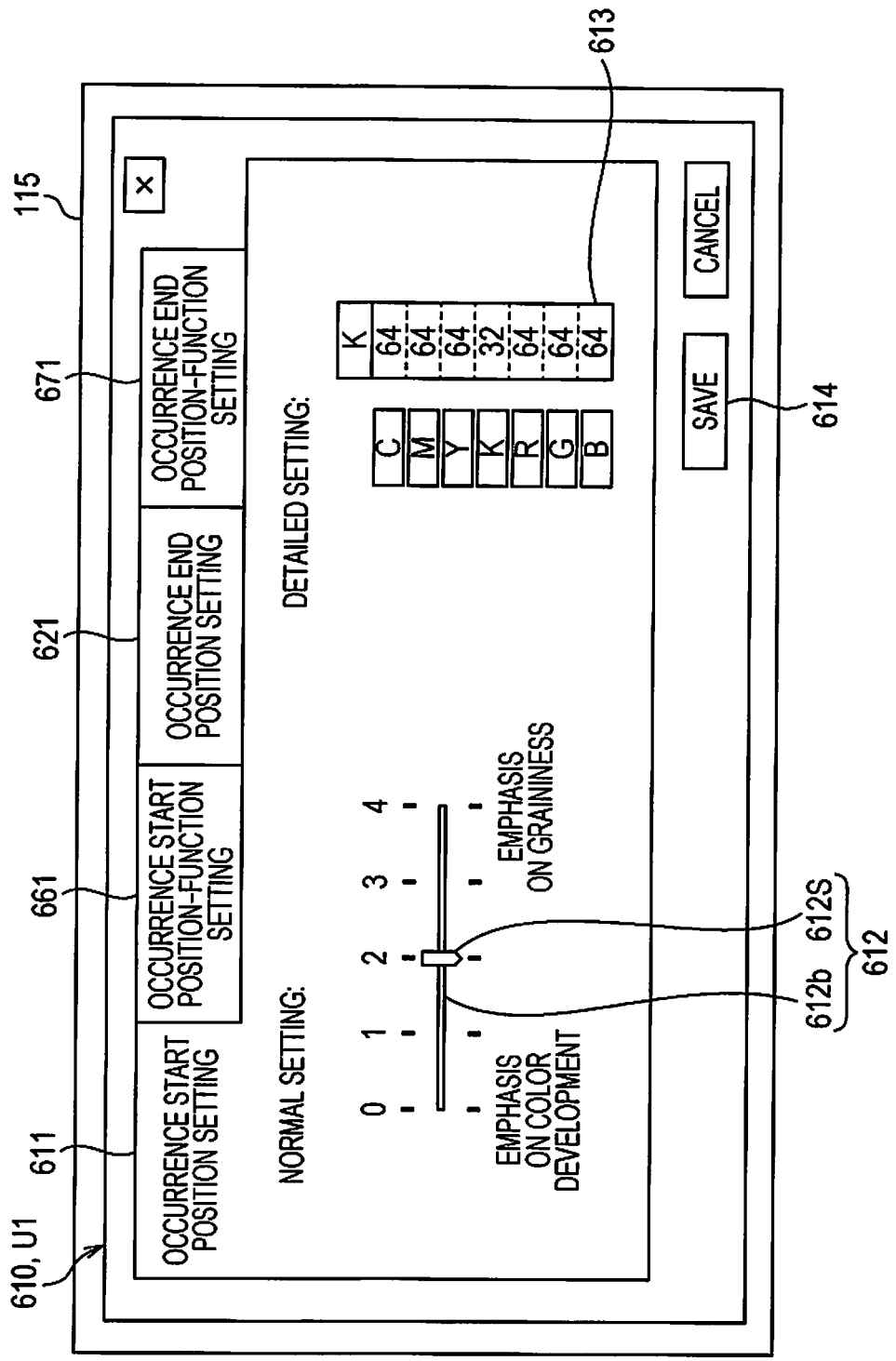
FIG. 5 is a diagram schematically illustrating an example of an occurrence start position setting screen.
Figure 20:
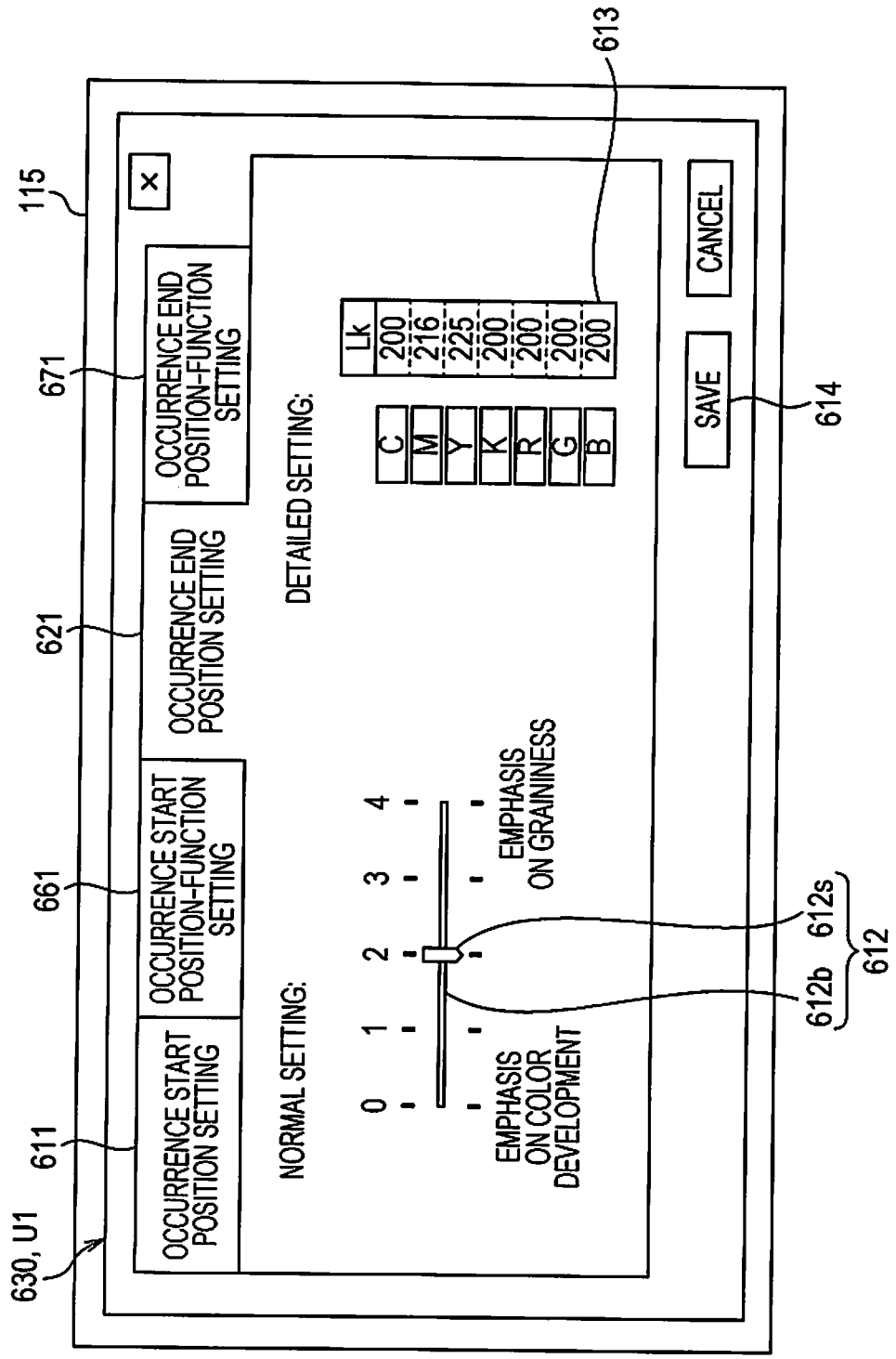
FIG. 20 is a diagram schematically illustrating an example of another occurrence end position setting screen.
Figure 21:
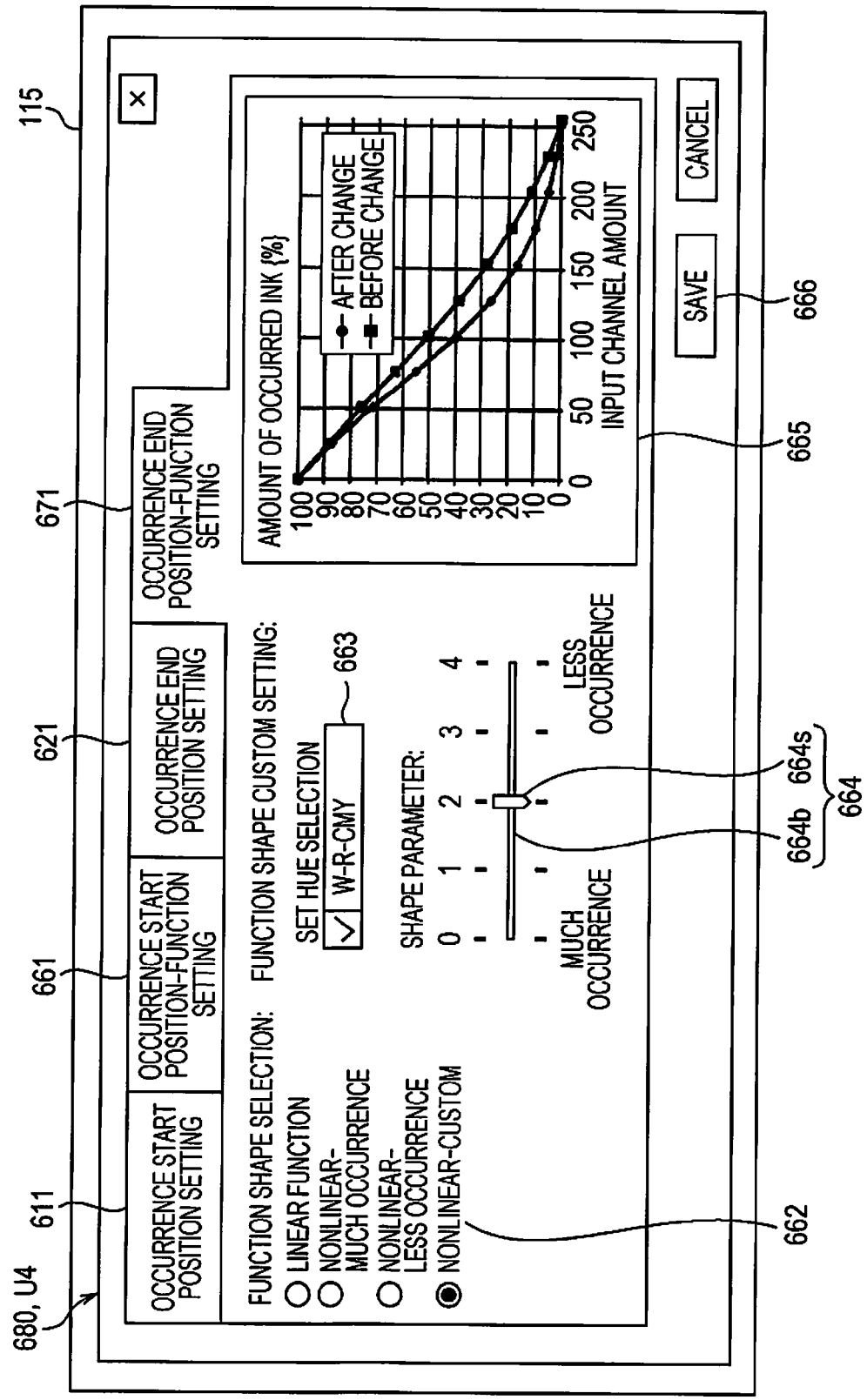
FIG. 21 is a diagram schematically illustrating an example of another function setting screen.

FIG. 5 schematically illustrates an example of an occurrence start position setting screen. FIG. 6 schematically illustrates an example of a function setting screen when the occurrence start position is set. An occurrence start position setting screen 610 illustrated in FIG. 5 and a function setting screen 660 illustrated in FIG. 6 are switched by an operation of tabs 611 and 661 by the input device 116. The color conversion table generation device 100 displays the occurrence start position setting screen 610 when an operation of the occurrence start position setting tab 611 is received and displays the function setting screen 660 when an operation of the function setting tab 661 at the time of setting the occurrence start position. Although description will be made later, as a modification example, the color conversion table generation device 100 displays an occurrence end position setting screen 630 as illustrated in FIG. 20 when an operation of an occurrence end position setting tab 621 is received, and displays a function setting screen 680 at the time of setting an occurrence end position as illustrated in FIG. 21 when an operation of a function setting tab 671 at the time of setting an occurrence end position is received.

The occurrence start position setting screen 610 illustrated in FIG. 5 includes a slider control 612, a detailed setting input field 613, a button 614, and the like.

The slider control 612 is an operation unit for collectively setting set values that represent respective ink occurrence positions (420) of seven axes included in the predefined axis A0 and is operable by moving a slider 612s along a slider bar 612b. The slider control 612 illustrated in in FIG. 5 is operable to stepwisely or continuously set from setting of 0 at which emphasis is made on color development (color reproduction region) of a print image to setting of 4 at which emphasis is made on a granular feeling (reduces granular feeling) of dots of the print image. The set values according to the position of the slider 612s may be displayed on the detailed setting input field 613. In a case where the occurrence positions (420) of seven axes are set for K ink, generally, as the slider is moved to become closer to the side where color development is emphasized, the occurrence position (420) becomes closer to a white point W side, and the slider is moved to become closer to the side where graininess is emphasized, the occurrence position (420) becomes closer to the black point D.

The detailed setting input field 613 is an operation unit for individually setting the set values that represent the occurrence positions (420) of seven axes included in the predefined axis A0. In the detailed setting input field 613, for example, the occurrence position (420) in a certain axis is represented by gradation values of 512 stages so that the white point W becomes 0 and the black point D becomes 511. In a case of the axis A0y passing through the pure yellow color point Y, the pure yellow color point Y is represented by 256 which is a value of an intermediate point. The axes passing through other pure color points R, M, B, C, and G are also similar to the axis A0y. Also, representation of the occurrence position (420) is not limited to representation described above. C, M, Y, K, R, G, and B of the input field 613 illustrated in FIG. 5 respectively correspond to the axis A0c, A0m, A0y, A0gray, A0r, A0g, and A0b. Accordingly, for example, when "C" of the input field 613 is a set value "64", it means that the occurrence position (420) is a position corresponding to the "64" of 512 stages in the axis A0c.

When an operation of the save button 614 by the input device 116 is received, the color conversion table generation device 100 stores the set values of the seven axes according to the operation received in the input field 613 or by the slider control 612 and causes processing to proceed to S110 of FIG. 3. That is, the color conversion table generation device 100 receiving setting in the occurrence start position setting screen 610 receives setting of the occurrence position (420) at which use of K ink is started for each of the axis A0c, A0m, A0y, A0gray, A0r, A0g, and A0b provided in the input color space CS1.

The occurrence start position setting screen may not include one of the slider control 612 and the detailed setting input field 613.

The function setting screen 660 illustrated in FIG. 6 includes selection fields 662 and 663, a slider control 664, a function display field 665, a button 666, and the like.

Figures 7A, 7B:
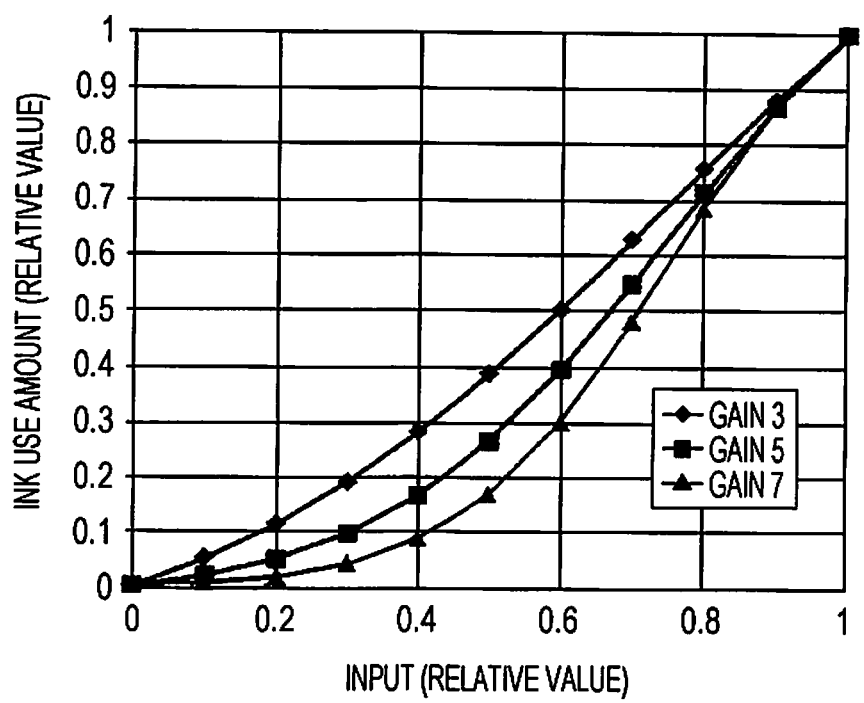
FIG. 7A is a diagram schematically illustrating an example of a function obtaining an ink use amount from an input value representing a position of a predefined axis and FIG. 7B is a diagram schematically illustrating an example of a relationship between a shape parameter set value and a gain.

The function shape selection field 662 is an operation unit for selecting a shape of the function 460 representing an occurrence ratio of K ink from the occurrence position (420) to the black point D for the seven axes. The function 460 may include a linear function, a quadratic function, a sigmoid function, a spline function, and the like, but is not limited thereto. The function shape selection field 662 illustrated in FIG. 6 is able to perform an operation to select any item from among a "linear function", a "nonlinear-much occurrence", a "nonlinear-less occurrence", and a "nonlinear-custom". Furthermore, a "nonlinear" means a nonlinear function, the "nonlinear-much occurrence" means that a nonlinear function, which has a shape of which the ink use amount with respect to, for example, an input like a "gain 3" illustrated in FIG. 7A is relatively much, is selected among a plurality of nonlinear functions to be prepared, and the "nonlinear-less occurrence" means that a nonlinear function, which has a shape of which the ink use amount with respect to, for example, an input like a "gain 7" illustrated in FIG. 7A is relatively less, is selected among a plurality of nonlinear functions to be prepared.

In a case where the "nonlinear-custom" is selected in the function shape selection field 662, the set hue selection field 663 is an operation unit for selecting a target axis targeted for setting the function 460 from among the seven axes. For example, when a "W-R-CMY" is selected in the set hue selection field 663, the axis-via-R A0r passing through the pure red color point R is selected.

In a case where the "nonlinear-custom" is selected in the function shape selection field 662, the slider control 664 is an operation unit for setting the set value which represents the shape of the function to be set in the axis selected in the set hue selection field 663, and is able to perform an operation for causing the slider 664s to be moved along a slider bar 664b. The slider control 664 illustrated in FIG. 6 is operable to stepwisely or continuously set from setting of 0 at which occurrence of K ink is much to setting of 4 at which occurrence of K ink is less.

The function display field 665 is an area for displaying the shape of the function according to an operation to the selection fields 662 and 663 and the slider control 664.

When an operation of a save button 666 by the input device 116 is received, the color conversion table generation device 100 stores the set values representing functions 461, 462, 463, . . . of the seven axes according to the operations received in the selection fields 662 and 663 and by the slider control 664, and causes processing to proceed to S110 of FIG. 3. That is, the color conversion table generation device 100 receiving setting in the function setting screen 660 receives setting of the function 460 used in setting the use amount of K ink.

Here, in a case where the function 460 is a sigmoid function, an example in which the set value of the function setting screen 660 is determined will be described in the following. A general form of the sigmoid function becomes a following expression.

$$\varsigma(t) = \frac{n}{1 + e^{-a(t-c)}} \tag{1}$$

Here, it is represented that e is the base of a natural logarithm, n is the maximum value of the function, a is a gain, and c is an independent variable which becomes an intermediate value of the function. The gain is a is a constant contributing to a shape of the function. The independent variable t is a parameter to represent a set value of 0 as 0.0 and a set value of 255 as 1.0 for an input channel selected from among the seven axes.

For example, when it is set that n=1 and c=0.75, the sigmoid function becomes the following expression.

$$\varsigma(t) = \frac{1}{1 + e^{-a(t-0.75)}} \quad (2)$$

In this case, when a value of the gain a is made large, the dependent variable becomes a value smaller than the linear function, and when the value of the gain a is made small, the dependent variable approaches the linear function.

Furthermore, the sigmoid function used in the present specification is subjected to normalization such that the dependent variable becomes 0 when the independent variable is 0 and the dependent variable becomes 1 when the independent variable is 100. Normalization is performed on a sigmoid function value obtained for t by using a value of S(0.0) (S is a variant of sigma) as Smin and similarly, using a value of S(1.0) as Smax in Expression (2).

$$\varsigma'(t) = \frac{\varsigma(t) - \varsigma_{min}}{\varsigma_{max} - \varsigma_{min}} \quad (3)$$

An example of the sigmoid function obtained as described above is illustrated in FIG. 7A.

When the sigmoid function is obtained by processing for calculating the use amount of K ink, the dependent variable is used as a proportion for the original ink amount upper limit UL and the ink amount upper limit UL corresponds to a relative value of 1.0. In a case where the sigmoid function is applied to the function setting screen 660 illustrated in FIG. 6, as illustrated in FIG. 7B, gains a=3.0, a=4.0, a=5.0, a=6.0, and a=7.0 are respectively corresponded to the set values of 0, 1, 2, 3, and 4 of the slider control 664 to determine the shape of the function 460.

After the ink occurrence position (420) and the function 460 are set, the color conversion table generation device 100 determines whether K ink is to be used at least at the grid points GD2 located at positions except for the predefined axis A0 among the grid points GD0 of the input color space CS1, based on the occurrence positions (420) of the respective axis A0c, A0m, A0y, A0gray, A0r, A0g, and A0b (S110 of FIG. 3). In the following, an example of a way of determining usability of K ink will be described with reference FIGS. 8, 9A to 9C, and 10A to 10C.

FIG. 8 illustrates an example of specific color material usability determination processing performed in S110. When processing is started, the color conversion table generation device 100 sets a triangle TR0 connecting ink occurrence positions of the first selection axis A1 and the second selection axis A2 adjacent to each other in the hue direction, among the axis A0y, A0r, A0m, A0b, A0c, and A0g that surround the gray axis A0gray, and the ink occurrence position Pgray of the gray axis A0gray (example of third selection axis A3) (S202).

Figure 9B:
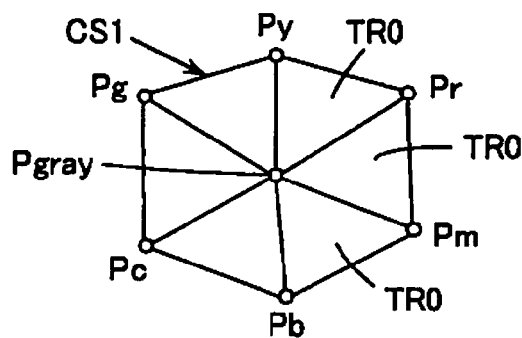
FIG. 9B is a diagram schematically illustrating an example when the triangle is viewed from a white point side of FIG. 9A.

FIG. 9A schematically illustrates six triangles TR0, which connect ink occurrence position of the first selection axis A1, ink occurrence positions of the second selection axis A2, and the ink occurrence position Pgray of the gray axis, by a thick line. FIG. 9B schematically illustrates six triangles TR0 when viewed from the white point W side of FIG. 9A. These triangles TR0 include a triangle connecting the occurrence positions Py, Pr, and Pgray, a triangle connecting the occurrence positions Pr, Pm, and Pgray, a triangle connecting the occurrence positions Pm, Pb, and Pgray, a triangle connecting the occurrence positions Pb, Pc, and Pgray, a triangle connecting the occurrence positions Pc, Pg, and Pgray, and a triangle connecting the occurrence positions Pg, Py, and Pgray. In the present specific example, the first selection axis A1 and the second selection axis A2 are relatively determined from among the axis A0y, A0r, A0m, A0b, A0c, and A0g. For example, in the triangle connecting the occurrence positions Py, Pr, and Pgray, for example, the axis-via-Y A0y becomes the first selection axis A1 (or second selection axis A2) and the axis-via-R A0r becomes the second selection axis A2 (or first selection axis A1). The six triangles TR0 become boundaries discerning whether use of K ink is caused to occur in the grid points GD0 defined in the color conversion table 400.

Figure 9C:
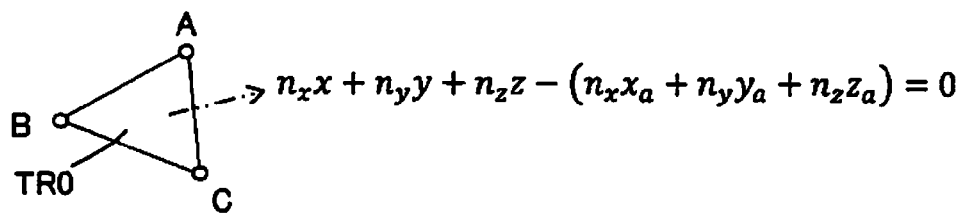
FIG. 9C is a diagram schematically illustrating an example of an equation of a plane including the triangle.

As illustrated in FIG. 9C, when the coordinates of a point A is set as $(x_a, y_a, z_a)$ and an outer product of a vector extending from the point A to a point B and a vector extending from the point A to a point C is set as $n_v = (n_x, n_y, n_z)$, a plane including the triangle connecting the points A, B, and C is represented by the following equation.

$$n_x x + n_y y + n_z z - (n_x x_a + n_y y_a + n_z z_a) = 0 \quad (4)$$

But, it is needed to specify which triangle TR0 to be compared with the grid point GD0 targeted for determining whether occurrence of K ink is caused or not in the position except for the predefined axis A0. Although various achieving means may be considered, in the present specific example, the triangle TR0 is specified by determining which tetrahedron obtained by dividing the input color space CS1 the grid point to be processed is included, as illustrated in FIG. 10A.

After the six triangles TR0 are set, the color conversion table generation device 100 divides the input color space CS1 into six tetrahedrons TE0 formed by using two pure color points adjacent to each other in the hue direction, the white point W, and the black point D as vertices (S204 of FIG. 8). In this case, the tetrahedron TE0 is set in the input color space CS1 having a cube shape illustrated in FIG. 2A.

FIG. 10A schematically illustrates a state where the tetrahedron TE0 is set in the input color space CS1 by a thick line. In an example illustrated in FIG. 10A, the tetrahedron TE0 is formed by using the pure magenta color point M that the axis-via-M A0m (example of first selection axis A1) passes through, the pure blue color point B that the axis-via-B (example of second selection axis A2) passes through, the white point W, and the black point D as vertices. In the six tetrahedrons TE0 which are set in the input color space CS1, a tetrahedron formed by using the Y, R, W, and D as vertices, a tetrahedron formed by using the R, M, W, and D as vertices, a tetrahedron formed by using the M, B, W, and D as vertices, a tetrahedron formed by using the B, C, W, and D as vertices, a tetrahedron formed by using the C, G, W, and D as vertices, and a tetrahedron formed by using the G, Y, W, and D as vertices are included.

After the six tetrahedrons TE0 are set, the color conversion table generation device 100 sets the grid point to be processed from among all grid points GD0 defined in the color conversion table 400 and determines which tetrahedron the grid point to be processed is included (S206). Furthermore, the grid points to be processed include the grid point GD1 on the predefined axis A0 and the grid point GD2 at a position which is not present in the predefined axis A0. In the present specific example, both the grid points GD1 and GD2 are collectively subjected to determination whether occurrence of K ink is caused or not. In this case, although the grid points GD1 on the predefined axes are included in a plurality of tetrahedrons TE0 including the predefined axes, the grid points to be processed are included only in the tetrahedron for which it is determined first that the grid points to be processed are included by determining whether the grid points to be processed are included in the tetrahedron or not, according to, for example, the order of the tetrahedrons described above.

FIG. 10B is a schematic diagram for explaining an example of a way of determining whether the grid point GD2 is included in the tetrahedron TE0 or not. In FIG. 10B, vertices of one tetrahedron among six tetrahedrons TE0 are represented by A, B, C, and D and the grid point to be processed is represented by a point P. Here, the vertices B and C are different from the pure color points B and C, and the vertex D in the tetrahedron is different from the black point D. When vectors using the vertex D as a base point are represented by $V_a$, $V_b$, and $V_c$, a volume $V_0$ of a tetrahedron ABCD is obtained by the following expression.

$$V_0 = \frac{V_a \cdot (V_b \times V_c)}{6} \quad (5)$$

It is possible to form four three-dimensional shapes of a tetrahedron PABC, a tetrahedron PABD, a tetrahedron PACD, and a tetrahedron PBCD by three points among the vertices A, B, C, and D and the point P. Volumes $V_1$ to $V_4$ of the four tetrahedrons can also be obtained by using an expression similar to Expression (5). For example, when vectors using the point P as the base point are represented by $y_{ap}$, $V_{bp}$, and $V_{cp}$, the volume $V_1$ of the tetrahedron PABC is obtained by the following expression.

$$V_1 = \frac{V_{pa} \cdot (V_{pb} \times V_{pc})}{6} \quad (6)$$

Here, in a case where a total V' of $V_1$ to $V_4$ is equal to $V_0$, the point P is present inside the tetrahedron ABCD. In a case where the total V' of $V_1$ to $V_4$ is not equal to $V_0$, the point P is present outside the tetrahedron ABCD. In a case where it is determined that the point P is present inside the tetrahedron ABCD, it may be determined that the grid point GD0 to be processed is included in the tetrahedron ABCD and searching of the tetrahedron TE0 may be ended. The triangle TR0 included in a tetrahedron, for which it is determined that the grid point GD0 to be processed is included, among the six tetrahedrons TE0 is used in processing of S208 of FIG. 8.

When a triangle to be used is specified among the six triangles TR0 in S206 of FIG. 8, the color conversion table generation device 100 obtains a positional relationship between the specified triangle TR0 and the grid point GD0 to be processed (S208). That is, in processing of S206 to S208, it is determined whether the grid point GD0 is included in the tetrahedron TE0 and in a case where it is determined that the grid point GD0 is included in the tetrahedron TE0, the positional relationship between the specified triangle TR0 and the grid point GD0 is obtained.

FIG. 10C is a schematic diagram for explaining an example of a way of determining whether K ink is to be used in the grid point GD0 or not, based on the positional relationship between the specified triangle TR0 and the grid point GD0. In FIG. 10C, control points A and B are selected from among the ink occurrence positions Py, Pr, Pm, Pb, Pc, and Pg and are points adjacent to each other in the hue direction. A triangle TR0 connecting the points Pgray, and B is a triangle specified in S206. Here, a vector to the grid point P to be processed is set as $V_p = (V_{pC}, V_{pM}, V_{pY})$ by using the black point D as a base point and the coordinate of the black point D is set as $(C_C, M_M, Y_Y)$ by using a unit vector of the vector as $nV_p = (nV_{pC}, nV_{pM}, nV_{pY})$. An intersection point P' of a straight line passing through a dark point D in a direction $nV_p$ and a plane including the triangle TR0 is obtained as follows.

A point Q away from the black point D by a distance l in the $nV_p$ direction is represented by the following expression.

$$Q = D + l \cdot nv_p \quad (7)$$

When the coordinates of the point Q is represented by $(Q_C, Q_M, Q_Y)$, respective elements are represented by the following expression.

$$Q_C = C_C + l \cdot nv_{pC}, Q_M = C_M + l \cdot nv_{pM}, Q_Y = C_Y + l \cdot nv_{pY} \quad (8)$$

It is assumed that an equation of the plane including the triangle TR0 is aC+bM+cY+d=0. It is assumed that coefficients a, b, c, and d are already calculated at the time of forming the triangle. The C, M, and Y correspond to the C, M, and Y of the input channel, respectively. When it is assumed that the point Q is present on the triangle TR0, the following expression is established.

$$a \cdot (C_C + l \cdot nv_{pC}) + b \cdot (C_M + l \cdot nv_{pM}) + c \cdot (C_Y + l \cdot nv_{pY}) + d = 0 \quad (9)$$

In this case, the point Q becomes the intersection point P' illustrated in FIG. 10C.

When Expression (9) is transformed and arranged for the distance l, the following expression is obtained.

$$l = \frac{-(a \cdot C_C + b \cdot C_M + c \cdot C_Y + d)}{a \cdot nv_{pC} + b \cdot nv_{pM} + c \cdot nv_{pY}} \quad (10)$$

All terms of the right side are known and thus, the terms are substituted into the expression to obtain the distance l. When the obtained distance l is substituted into Expression (7), the coordinate of the intersection point P' is obtained.

$$P' = D + l \cdot nv_p \quad (11)$$

Here, it is assumed that a ratio of the distance between the black point D and the grid point P to be processed to the distance between the black point D and the intersection point P is the parameter t. The size of the vector DP' is compared with that of the vector DP so as to make it possible to obtain a value of the parameter t in the grid point P to be processed.

$$t = 1.0 - \frac{|DP|}{|DP'|} \quad (12)$$

Furthermore, the vector DP' and the vector DP are present in the same straight line and thus, an inner product of two vectors is equivalent to a ratio of the size.

As described above, the positional relationship between the triangle TR0 and the grid point GD0 to be processed is derived as the parameter t and is stored in, for example, the RAM 113.

When the positional relationship between the triangle TR0 and the grid point GD0 to be processed is obtained in S208 of FIG. 8, the color conversion table generation device 100 determines whether K ink is to be used at the grid point GD0 to be processed or not, based on the parameter t representing the positional relationship (S210). Here, when the parameter t is less than zero, it is determined that the grid point GD0 to be processed is closer to the white point W side than to the triangle TR0, and K ink is not used. When the parameter t is greater than or equal to zero, it is determined that the grid point GD0 to be processed is closer to the black point D side than to the triangle TR0, K ink is used.

In a case where a grid point for which processing of S206 to S210 is not performed remains among all grid points GD0, the color conversion table generation device 100 repeats processing of S206 to S210 and in a case where processing of S206 to S210 is performed for all grid points GD0, the color conversion table generation device 100 ends specific color material usability determination processing.

In a case where the occurrence end position at which use of a specific color material is ended is set by using the white point W as the base point, the occurrence position (420) may be replaced by a reference to the occurrence end position, the vector $V_p=(V_{pC}, V_{pM}, V_{pY})$ may be changed to a vector in which the white point W not the black point D is used as the base point, and the unit vector thereof may be set as $nV_p=(nV_{pC}, nV_{pM}, nV_{pY})$. Similarly, in other processing, the occurrence end position at which use of the specific color material is ended can be set by using the white point W as the base point.

After usability of K ink is determined in S110 of FIG. 3, the color conversion table generation device 100 sets a use amount of K ink for the grid point GD0 at which K ink is to be used (S112). In this case, in a case where the function 460, which obtains a value representing the ink use amount from a value representing the position of the predefined axis A0, is set, the function 460 is used to thereby set the use amount of K ink. When the parameter t is determined, it is possible to obtain the ink use amount of K ink in the predefined axis A0 surrounding the grid point GD2 to be processed and to interpolate the use amount of K ink of the grid point GD2 to be processed from the ink use amount. In the present specific example, the use amount of K ink is obtained also for the grid point GD1 on the predefined axis A0 by the same algorithm.

FIG. 11 illustrates an example of specific color material use amount determination processing for the grid point at which K ink is to be used performed in S112. When processing is started, the color conversion table generation device 100 sets a point on the first selection axis A1, a point on the second selection axis A2, and the point Qgray on the gray axis A0gray according to the parameter t for the grid point to be processed by using the specified triangle TR0 as a reference (S302).

FIG. 12A schematically illustrates an example of a way of setting a use amount of K ink at a position (point P) of the grid point GD2 of the input color space CS1. In FIG. 12A, an example, in which the axis-via-B A0b is the first selection axis A1, the point on the first selection axis A1 according to the parameter t is Qb, the axis-via-C A0c is the second selection axis A2, the point on the second selection axis A2 according to the parameter t is Qc, the gray axis A0gray is the third selection axis A3, and the point on the third selection axis A3 according to the parameter t is Qgray, is illustrated. That is, in a case where |P'D|:|P'P|=1:t, it is that |PbD|:|PbQb|=1:t, |PcD|:|PcQc|=1:t, and |PgrayD|:|Pgray-Qgray|=1:t. When the points Qb, Qc, and Qgray according to the parameter t are connected, a triangle TRt for interpolation is formed between the black point D and the triangle TR0.

After setting the point according to the parameter t, the color conversion table generation device 100 uses the function 460, which obtains the value representing the use amount of K ink from the value representing the position of the predefined axis A0, to thereby obtain the use amount of K ink of the points Qb, Qc, and Qgray according to the parameter t (S304). As illustrated in FIG. 12A, in a case where a function 461 is set between the point Pb and the black point D in the first selection axis A1, the parameter t may be substituted into the function 461 to calculate the use amount of K ink. In a case where a function 462 is set between the point Pc and the black point D in the second selection axis A2, the parameter t may be substituted into the function 462 to calculate the use amount of K ink. In a case where a function 463 is set between the point Pgray and the black point D in the third selection axis A3, the parameter t may be substituted into the function 463 to calculate the use amount of K ink.

After calculating the use amount of K ink at the points Qb, Qc, and Qgray, the color conversion table generation device 100 obtains the use amount of K ink at the grid point GD0 to be processed by an interpolation operation (S306). In this way, the use amount of K ink in the position of the grid point GD0 of the input color space CS1 is set, based on the positional relationship between the triangle TR0 and the grid point GD0 to be processed, by using the function 460 in the input color space CS1.

FIG. 12B schematically illustrates an example of a way of interpolating the use amount of K ink. For convenience of representation of a calculation expression, the vertex Qc of the triangle TRt is replaced with the point A, the vertex Qgray of the triangle TRt is replaced with the point B, and the vertex Qb of the triangle TRt is replaced with the point C. The points B and C are different from the pure color points B and C. In a case where a suffix is added to each point, it is assumed the each point with the suffix represent the coordinate value of each of the points C, M, and Y. Furthermore, it is assumed the use amount of K ink of the vertices A, B, and C are $I_A$, $I_B$, and $I_C$, respectively.

First, Vectors $V_1$ and $V_2$ to the remaining two vertices and a vector $V_p$ to the grid point P to be processed are obtained by using one vertex A of the triangle TRt as the base point.

$$v_1 = \begin{pmatrix} v_{1C} \\ v_{1M} \\ v_{1Y} \end{pmatrix} = \begin{pmatrix} B_C - A_C \\ B_M - A_M \\ B_Y - A_Y \end{pmatrix} \quad (13)$$

$$v_2 = \begin{pmatrix} v_{2C} \\ v_{2M} \\ v_{2Y} \end{pmatrix} = \begin{pmatrix} C_C - A_C \\ C_M - A_M \\ C_Y - A_Y \end{pmatrix}$$

$$v_p = \begin{pmatrix} v_{pC} \\ v_{pM} \\ v_{pY} \end{pmatrix} = \begin{pmatrix} P_C - A_C \\ P_M - A_M \\ P_Y - A_Y \end{pmatrix}$$

An outer product $V_c$ of the vectors $V_1$ and $V_2$ is obtained.

$$v_c = \begin{pmatrix} v_{cC} \\ v_{cM} \\ v_{cY} \end{pmatrix} = v_1 \times v_2 \quad (14)$$

Here, a local coordinate system (u, v, w) configured with the point A and the vectors $V_1$ and $V_2$ is considered. When it is assumed that coordinates of the grid point P to be processed in the local coordinate system are $P_u$, $P_v$, and $P_w$, the following relationship is established between the coordinates of the grid point P of the local coordinate system and coordinates of the point P of the input channel coordinate system (C, M, Y).

$$\begin{pmatrix} P_C \\ P_M \\ P_Y \end{pmatrix} = \begin{pmatrix} A_C \\ A_M \\ A_Y \end{pmatrix} + \begin{pmatrix} v_{1C} & v_{2C} & v_{cC} \\ v_{1M} & v_{2M} & v_{cM} \\ v_{1Y} & v_{2Y} & v_{cY} \end{pmatrix} \begin{pmatrix} P_u \\ P_v \\ P_w \end{pmatrix} \quad (15)$$

When Expression (15) is transformed so that the local coordinates of the point P is obtained from the input channel coordinates of the point P, Expression (15) is transformed into the following expression.

$$\begin{pmatrix} P_u \\ P_v \\ P_w \end{pmatrix} = \begin{pmatrix} v_{1C} & v_{2C} & v_{cC} \\ v_{1M} & v_{2M} & v_{cM} \\ v_{1Y} & v_{2Y} & v_{cY} \end{pmatrix}^{-1} \begin{pmatrix} P_C - A_c \\ P_M - A_M \\ P_Y - A_Y \end{pmatrix} \quad (16)$$

When the expression is rewritten using the vector $V_p$, the following expression is obtained.

$$\begin{pmatrix} P_u \\ P_v \\ P_w \end{pmatrix} = \begin{pmatrix} v_{1C} & v_{2C} & v_{cC} \\ v_{1M} & v_{2M} & v_{cM} \\ v_{1Y} & v_{2Y} & v_{cY} \end{pmatrix}^{-1} \begin{pmatrix} v_{pC} \\ v_{pM} \\ v_{pY} \end{pmatrix} \quad (17)$$

Expression (17) is used so as to obtain the local coordinate positions $P_u$, $P_v$, and $P_w$ of the point P from pieces of known grid point information. An ink use amount $I_P$ of the point P is calculated in the following expression by using the obtained coordinates of the point P in local coordinate system. Also, here, the use amount of K ink of the vertices A, B, and C are set as $I_A$, $I_B$, and $I_C$, respectively.

$$I_P = I_A + P_u(I_B - I_A) + P_v(I_C - I_A) \quad (18)$$

Furthermore, since there is a precondition that the point P is a point on the triangle TRt, $P_w$ is always 0. For that reason, the term $P_w$ is omitted in Expression (18). In a case where the ink use amount $I_P$ exceeds an ink amount upper limit UL, the ink use amount $I_P$ is replaced with the ink amount upper limit UL.

In a case where a grid point for which processing of S302 to S306 is not performed remains among all grid points GD0, the color conversion table generation device 100 repeats processing of S302 to S306 and in a case where processing of S302 to S306 is performed for all grid points GD0, the color conversion table generation device 100 ends specific color material use amount determination processing.

Furthermore, as described above, in a case where the occurrence end position at which use of the specific color material is ended is set by using the white point W as the base point, the black point D may be replaced by a reference to the white point W and the occurrence position (420) may be replaced by a reference to the occurrence end position.

After setting the use amount of K ink in S112 of FIG. 3, the color conversion table generation device 100 sets a use amount of CMY ink, generates a color conversion table 400 illustrated in FIG. 13 (S114), and ends color conversion table generation processing. When the use amount of CMY ink is set on the predefined axis A0, the use amount of CMY ink can be determined by the same processing as specific color material use amount determination processing illustrated in FIG. 11. The color conversion table 400 illustrated in FIG. 13 is information representing a correspondence relationship between coordinate values (Rj, Gj, and Bj) of RGB color space (input color space CS1) depended on an input device and coordinate values (Cj, Mj, Yj, and Kj) of CMYK color space (output color space CS2) depended on an output device. The coordinate values (Rj, Gj, and Bj) represent an amount of the RGB color. The coordinate values (Cj, Mj, Yj, and Kj) represent a use amount of CMYK ink. The variable j is a variable identifying respective grid points GD0 corresponding to the coordinates of the input color space CS1. The output coordinate values (Cj, Mj, Yj, and Kj) are defined so that an ink ejection amount is within a range of the ink amount upper limit UL. As illustrated in FIG. 13, when the input coordinate values (Rj, Gj, and Bj) and the output coordinate values (Cj, Mj, Yj, and Kj) are correlated with each other, it is possible to generate the color conversion table 400 in which the correspondence relationship is defined for each grid point GD0.

The generated color conversion table 400 is incorporated into, for example, a printer driver (not illustrated). A print control device realized by the printer driver generates output data representing the coordinate values (Cq, Mq, Yq, and Kq) of output color space CS2 from printing data which represents the coordinate values (Rq, Gq, and Bq) of input color space CS1 with reference to the color conversion table 400. When the piece of output data is transmitted to the printing device 200, the printing device 200 prints an image IM2 in the print substrate 290 based on the piece of output data and forms a printed matter PT2.

As described above, when the user sets the occurrence position (420) at which use of K ink is started in each of the axis A0gray, A0y, A0r, A0m, A0b, A0c, and A0g provided in the input color space CS1, it is determined whether K ink is to be used or not, also in the grid points GD2 at positions except for the axis A0gray, A0y, A0r, A0m, A0b, A0c, and A0g among the input color space CS1. With this, the user does not need to set whether K ink is to be used or not, for all grid points GD0. In a case where, it is determined that K ink is to be used at the grid point GD2 located at the position except for the predefined axis A0, the use amount of K ink at the position located at the grid point GD2 of the input color space CS1 is set. Accordingly, in the present specific example, it becomes possible to easily generate a color conversion table improving image quality of a print image.

5. EXPLANATION OF INPUT COLOR SPACE IN SECOND SPECIFIC EXAMPLE

Next, schematic four-dimensional input color space CS1 for obtaining the ink occurrence position (420) and the ink use amount will be described with reference to the example illustrated in FIGS. 14A and 14B.

It is assumed that input color space CS1 of the second specific example is CMYK color space including a one-dimensional axis of C (an example of a first input color), a one-dimensional axis of M (an example of a second input color), a one-dimensional axis of Y (an example of a third input color), and a one-dimensional axis of K (an example of a fourth input color). CMYK color space illustrated in FIG. 14A is schematically illustrated in such a way that a virtual hexahedron HE0 configured with the one-dimensional axis of C, one-dimensional axis of M, and one-dimensional axis of Y is moved due to variation in the K component.

The predefined axis A0 illustrated in FIG. 14A includes eight ridgeline axis A0w, A0c, A0m, A0y, A0r, A0g, A0b, and A0k that represent loci when eight vertices W, C, M, Y, R, G, B, and K are moved due to variation in an input channel value (component) of K in the virtual hexahedron HE0, in the input color space CS1. These ridgeline axis A0w, A0c, A0m, A0y, A0r, A0g, A0b, and A0k are collectively referred to as a ridgeline axis A10. Here, as illustrated in FIG. 14B, in a case where the input channel value of K is 0%, the vertex W indicates a white point having the highest brightness in the hexahedron HE0, the vertex C indicates a pure cyan color point in the hexahedron HE0, the vertex M indicates a pure magenta color point in the hexahedron HE0, the vertex Y indicates a pure yellow color point in the hexahedron HE0, the vertex R indicates a pure red color point in the hexahedron HE0, the vertex G indicates a pure green color point in the hexahedron HE0, the vertex B indicates a pure blue color point in the hexahedron HE0, and the vertex K indicates a black point having the lowest lightness in the hexahedron HE0. It is assumed that when such a hexahedron HE0 is moved until the input channel value of K becomes 100%, the vertices W, C, M, Y, R, G, B, and K become vertices We, Ce, Me, Ye, Re, Ge, Be, and Ke, respectively. The ridgeline axis A0w, A0c, A0m, A0y, A0r, A0g, A0b, and A0k that respectively become linear shaped axes having a line shape and respectively connecting the vertices W, C, M, Y, R, G, B, and K and the vertices We, Ce, Me, Ye, Re, Ge, Be, and Ke.

In FIG. 14A, ink occurrence positions Ws, Cs, Ms, Ys, Rs, Gs, Bs, and Ks that are respectively set on the ridgeline axis A0w, A0c, A0m, A0y, A0r, A0g, A0b, and A0k are also schematically illustrated.

The eight ridgeline axis A0w, A0c, A0m, A0y, A0r, A0g, A0b, and A0k are set in the predefined axis A0 to thereby make it possible to efficiently reduce work for setting the ink occurrence position (420) and the ink use amount. In this respect, although the eight ridgeline axes described above are preferably set as the predefined axis A0, a plurality of axes selected from among the eight ridgeline axes may be set in the predefined axis A0. That is, the predefined axis A0 is not limited to the eight axes and may include an axis other than the ridgeline axis A0w, A0c, A0m, A0y, A0r, A0g, A0b, and A0k described above.

Furthermore, in a case where the occurrence end position, at which use of the specific color material is ended, by using the hexahedron HE0 including the vertexW, which has the highest lightness in a direction along the predefined axis A0, as a base point, is set, the occurrence positions Ws, Cs, Ms, Ys, rs, Gs, Bs, and Ks may be replaced by a reference to the occurrence end positions.

6. COLOR CONVERSION TABLE GENERATION PROCESSING IN SECOND SPECIFIC EXAMPLE

Color conversion table generation processing in the second specific example is also can be performed according to color conversion table generation processing illustrated in FIG. 3. Color conversion table generation processing in the second specific example will be described with reference to FIG. 3.

When processing is started, the color conversion table generation device 100 receives selection of printing setting (S102), sets the ink amount upper limit UL (S104), displays the occurrence position and the function setting screen on the display device 115 (S106), and sets the ink occurrence position (420) and the function 460 (S108).

Figure 15:
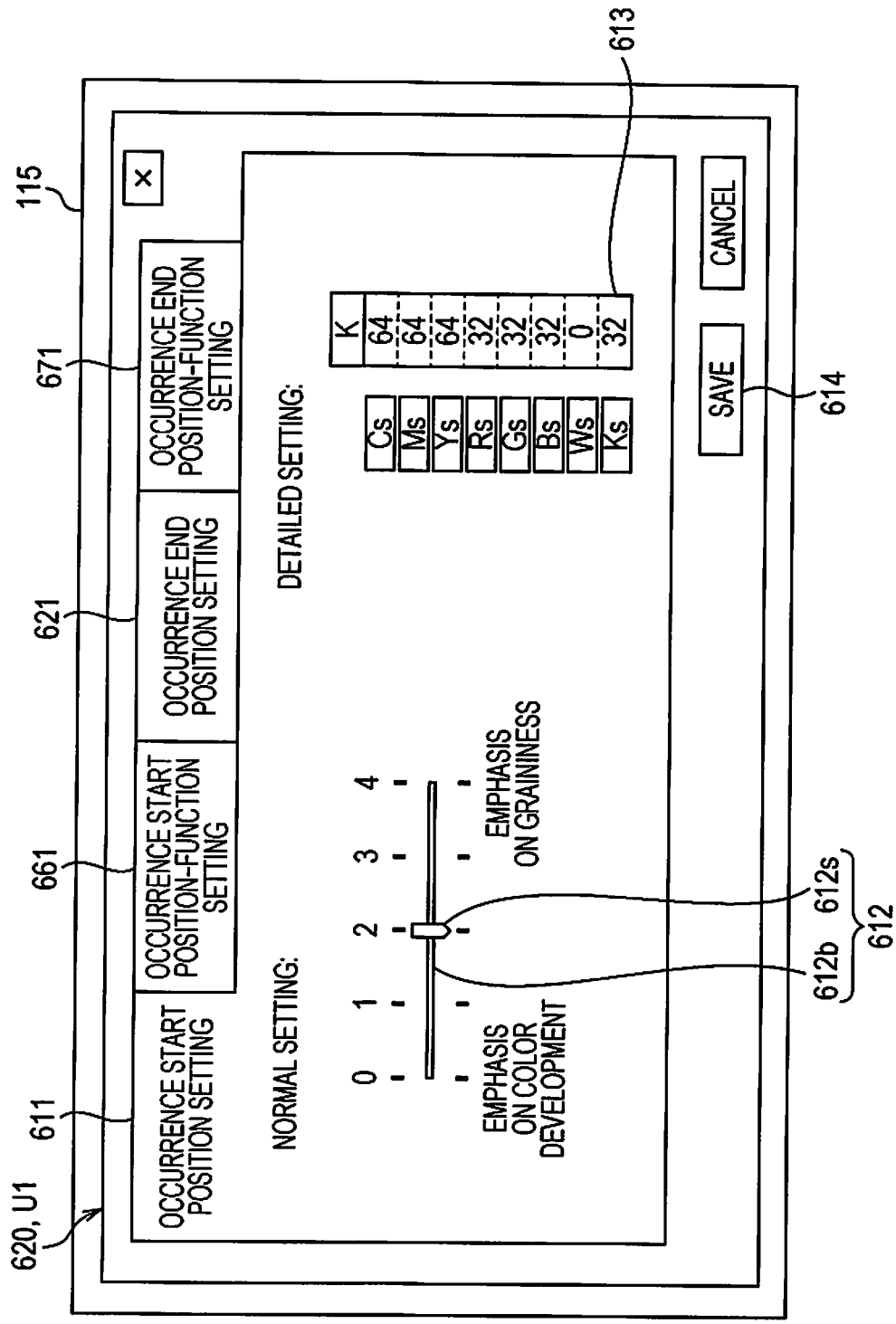
FIG. 15 is a diagram schematically illustrating an example of another occurrence start position setting screen.

FIG. 15 schematically illustrates an example of an occurrence start position setting screen. FIG. 16 schematically illustrates an example of a function setting screen. Same reference numerals are given to the same points as those in the screens illustrated in FIGS. 5 and 6, and detailed description thereof will be omitted. An occurrence start position setting screen 620 illustrated in FIG. 15 and a function setting screen 670 illustrated in FIG. 16 are switched by the operation of tabs 611 and 661 by the input device 116. The color conversion table generation device 100 displays the occurrence start position setting screen 620 when an operation of the occurrence start position setting tab 611 is received and displays the function setting screen 670 when an operation of the function setting tab 661 is received.

The detailed setting input field 613 of the occurrence start position setting screen 620 illustrated in FIG. 15 is made different from that of the occurrence start position setting screen 610 in FIG. 5. The detailed setting input field 613 illustrated in FIG. 15 is an operation unit for individually setting the set values which represent the occurrence positions (420) of eight ridgeline axes included in the predefined axis A0. For example, the occurrence position (420) in a certain ridgeline axis is represented by the gradation value of 256 stages in such a way that when an input of K is 0%, the occurrence position (420) becomes 0 and when the input of K is 100%, the occurrence position (420) becomes 255. Also, representation of the occurrence position (420) is not limited to representation described above. Cs, Ms, Ys, Rs, Gs, Bs, Ws, and Ks of the input field 613 illustrated in FIG. 15 respectively indicate the ink occurrence positions Cs, Ms, Ys, Rs, Gs, Bs, Ws, and Ks. Accordingly, for example, matters that the "Cs" of the input field 613 is the set value "64" means that the occurrence position (420) is a position corresponding to the "64" of 256 stages in the ridgeline axis A0c. Furthermore, the occurrence start position setting screen may not include one of the slider control 612 and the detailed setting input field 613.

When an operation of the save button 614 by the input device 116 is received, the color conversion table generation device 100 stores the set values of the eight ridgeline axes according to the operation received in the input field 613 or by the slider control 612, and causes processing to proceed to S110 of FIG. 3.

The selection field 663 of the function setting screen 670 illustrated in FIG. 16 is made different from that of the function setting screen 660 in FIG. 6. The selection field 663 illustrated in FIG. 16 is an operation unit for selecting a ridgeline axis targeted for setting the function 460 from among eight ridgeline axes in a case where the "nonlinear-custom" is selected in the function shape selection fields 662. For example, when the "R-Re" is selected in the selection field 663, the ridgeline axis A0r connecting the vertices R and Re is selected.

When an operation of the save button 666 by the input device 116 is received, the color conversion table generation device 100 stores the set values representing the functions 461, 462, 463, . . . of the eight ridgeline axes according to the operation received in the selection fields 662 and 663 or by the slider control 664 and causes processing to proceed to S110 of FIG. 3.

After the ink occurrence position (420) and the function 460 are set, the color conversion table generation device 100 determines whether K ink is to be used at the grid points GD0 of the input color space CS1, based on the occurrence positions (420) in respective ridgeline axis A0w, A0c, A0m, A0y, A0r, A0g, A0b, and A0k (S110 of FIG. 3). In the following, an example of a way of determining usability of K ink will be described with reference FIGS. 14A and 17. In FIG. 17, the hexahedron having a cubic shape and connecting the end-point positions We, Ce, Me, Ye, Re, Ge, Be, and Ke is the hexahedron HE0 when a parameter p=1. In FIG. 17, in order to make it easier to understand, the hexahedron (hexahedron when a parameter p=0) connecting the occurrence positions Ws, Cs, Ms, Ys, Rs, Gs, Bs, and Ks is schematically illustrated as a cubic shape, and a hexahedron HE1 of 0<p<1 is schematically illustrated, as a cubic shape, between the hexahedron of p=0 and the hexahedron of p=1. The hexahedron HE1 corresponds to the triangle TR0 illustrated in FIG. 9A and becomes a boundary distinguishing whether occurrence of K ink is to be caused at the grid point GD0 defined in the color conversion table 400 or not.

First, input channel positions of the grid point GD0 to be processed are represented by c, m, y, and K. Here, the input channel positions c, m, and y are values obtained by normalizing the actual input channel values with 0 to 1 (value obtained by dividing [0,255] by 255 to be normalized to [0,1]). The input channel position K represents an actual input channel value.

It is assumed that the parameter p is subjected to normalization so that the position of the grid point P to be processed is represented as 0 in the occurrence positions Ws, Cs, Ms, Ys, Rs, Gs, Bs, and Ks and is represented as 1 in the end-point positions We, Ce, Me, Ye, Re, Ge, Be, and Ke. For example, in the ridgeline axis A0C connecting the vertices C and Ce, when the position is a middle point between the occurrence position Cs and the end-point position Ce, it becomes that p=0.5. When a K channel value of the grid point P to be processed is set as K using such a parameter p and interpolation of a hexahedron is performed using an occurrence position and end position of each vertex and the parameter p, the following expression is established.

$$K = (1-c)(1-m)(1-y)((1-p)W_s + pW_e) + \quad (19)$$
$$c(1-m)(1-y)((1-p)C_s + pC_e) +$$
$$(1-c)m(1-y)((1-p)M_s + pM_e) +$$
$$(1-c)(1-m)y((1-p)Y_s + pY_e) + (1-c)my((1-p)R_s + pR_e) +$$
$$c(m-1)y((1-p)G_s + pG_e) + cmy((1-p)K_s + pK_e)$$

When Expression (19) is transformed with respect to K, Expression (19) becomes the following expressions.

$$K = (1-c)(1-m)(1-y)(W_e - W_s)p + \quad (20)$$
$$(1-c)(1-m)(1-y)W_s + c(1-m)(1-y)(C_e - C_s)p +$$
$$c(1-m)(1-y)C_s + (1-c)m(1-y)(M_e - M_s)p +$$
$$(1-c)m(1-y)M_s + (1-c)(1-m)y(Y_e - Y_s)p +$$
$$(1-c)(1-m)yY_s + (1-c)my(R_e - R_s)p +$$
$$(1-c)myR_s + c(m-1)y(G_e - G_s)p + c(m-1)yG_s +$$
$$cm(1-y)(B_e - B_s)p + cm(1-y)B_s + cmy(K_e - K_s)p + cmyK_s$$

$$K = \{(1-c)(1-m)(1-y)(W_e - W_s) + c(1-m)(1-y)(C_e - C_s) + \quad (21)$$
$$(1-c)m(1-y)(M_e - M_s) + (1-c)(1-m)y(Y_e - Y_s) +$$
$$(1-c)my(R_e - R_s) + c(m-1)y(G_e - G_s) +$$
$$cm(1-y)(B_e - B_s) + cmy(K_e - K_s)\}p +$$
$$(1-c)(1-m)(1-y)W_s + c(1-m)(1-y)C_s +$$
$$(1-c)m(1-y)M_s +$$
$$(1-c)(1-m)yY_s + (1-c)myR_s +$$
$$c(m-1)yG_s + cm(1-y)B_s + cmyK_s$$

This expression is transformed with respect to the parameter p, the following expression is obtained.

$$p = \frac{\begin{array}{c}K - (1-c)(1-m)(1-y)W_s + c(1-m)(1-y)C_s + \\ (1-c)m(1-y)M_s + (1-c)(1-m)yY_s + (1-c)myR_s + \\ c(m-1)yG_s + cm(1-y)B_s + cmyK_s\end{array}}{\begin{array}{c}(1-c)(1-m)(1-y)(W_e - W_s) + c(1-m)(1-y)(C_e - C_s) + \\ (1-c)m(1-y)(M_e - M_s) + (1-c)(1-m)y(Y_e - Y_s) + \\ (1-c)my(R_e - R_s) + c(m-1)y(G_e - G_s) + \\ cm(1-y)(B_e - B_s) + cmy(K_e - K_s)\end{array}} \quad (22)$$

Furthermore, Expression (22) is illustrated also in FIG. 19.

All terms of the right side of Expression (22) are known and thus, when the input channel positions c, m, y, and K of the grid point P to be processed are determined, the parameter p can be calculated.

As described above, the positional relationship between the occurrence positions Ws, Cs, Ms, Ys, Rs, Gs, Bs, and Ks and the grid point GD0 to be processed is derived as the parameter p and is stored in, for example, the RAM 113. Here, when the parameter p is less than or equal to zero, it is determined that the grid point GD0 to be processed is closer to a K input 0% side in its entirety than to the occurrence positions Ws, Cs, Ms, Ys, Rs, Gs, Bs, and Ks and K ink is not used. When the parameter p is greater than or equal to zero, it is determined that the grid point GD0 to be processed is closer to a K input 100% side than to the occurrence positions Ws, Cs, Ms, Ys, Rs, Gs, Bs, and Ks, and K ink is used. The color conversion table generation device 100 determines usability K ink for all grid points GD0.

In a case where the occurrence end positions at which use of the specific color material is ended is set by using the vertices W, C, M, Y, R, G, B, and K of the hexahedron HE0 as the base points, the occurrence positions Ws, Cs, Ms, Ys, Rs, Gs, Bs, and Ks may be replaced by a reference to the occurrence end positions and the end-point positions We, Ce, Me, Ye, Re, Ge, Be, and Ke may be replaced by a reference to the start positions W, C, M, Y, R, G, B, and K. In a case where the occurrence positions Ws, Cs, Ms, Ys, Rs, Gs, Bs, and Ks are set, the input values of the end-point positions We, Ce, Me, Ye, Re, Ge, Be, and Ke are 100%, but in a case where the occurrence end positions are set, the input values of the start positions W, C, M, Y, R, G, B, and K are 0%. Accordingly, in a case where the occurrence positions Ws, Cs, Ms, Ys, Rs, Gs, Bs, and Ks are set, We, Ce, Me, Ye, Re, Ge, Be, and Ke of Expressions (19) to (22) may be set as 100%, and in a case where the occurrence end positions are set, We, Ce, Me, Ye, Re, Ge, Be, and Ke may be set as 0%. Similarly, in other processing, the occurrence end positions at which use of the specific color material is ended can be set by using the vertices W, C, M, Y, R, G, B, and K as the base points.

After usability of K ink is determined in S110 of FIG. 3, the color conversion table generation device 100 sets the use amount of K ink on the grid point GD0 at which K ink is to be used (S112). In this case, in a case where the function 460, which obtains the value representing the ink use amount from the value representing the position of the predefined axis A0, is set, the use amount of K ink is set by using the function 460. When the parameter p is determined, it is possible to obtain the use amount of K ink in the predefined axis A0 surrounding the grid point GD2 to be processed and to interpolate the use amount of K ink of the grid point GD2 to be processed from the obtained use amount. Also, in the present specific example, the use amount of K ink is obtained also for the grid point GD1 on the predefined axis A0 by the same algorithm.

FIG. 17 schematically illustrates an example of a way of setting the use amount of K ink at the position (point P) of the grid point GD2 of the four-dimensional input color space CS1. In a case where the functions 461, 462, 463, . . . are set respectively in the ridgeline axis A0w, A0c, A0m, A0y, A0r, A0g, A0b, and A0k, the parameter p may be substituted into each of the functions 461, 462, 463, . . . to thereby calculate the use amount of K ink according to the parameter p in each of the ridgeline axes. Furthermore, the color conversion table generation device 100 obtains the use amount of K ink in the grid point GD0 to be processed by an interpolation operation.

Here, it is assumed that the use amount of K ink in the positions according to the parameter p in the ridgeline axis A0w, A0c, A0m, A0y, A0r, A0g, A0b, and A0k are respectively $I_W$, $I_C$, $I_M$, $I_Y$, $I_R$, $I_G$, $I_B$, and $I_K$. When interpolation of a hexahedron is performed on the use amount of K ink of the grid point P to be processed using the ink use amount, the following expression is obtained and it is possible to calculate a desired ink use amount $I_P$.

$$I_P = (1-c)(1-m)(1-y)I_W + c(1-m)(1-y)I_C + \qquad (23)$$
$$(1-c)m(1-y)I_M + (1-c)(1-m)yI_Y +$$
$$(1-c)myI_P + c(1-m)yI_G + cm(1-y)I_Y + cmyI_K$$

However, in a case where the ink use amount $I_P$ exceeds the ink amount upper limit UL, the ink use amount $I_P$ is replaced with the ink amount upper limit UL.

The color conversion table generation device 100 determines the use amount of K ink for all grid points GD0.

As described above, in a case where the occurrence end positions at which use of the specific color material is ended are set by using the vertices W, C, M, Y, R, G, B, and K of the hexahedron HE0 as the base points, the occurrence positions Ws, Cs, Ms, Ys, Rs, Gs, Bs, and Ks may be replaced by a reference to the occurrence end position and the end-point positions We, Ce, Me, Ye, Re, Ge, Be, and Ke may be replaced by a reference to the start positions W, C, M, Y, R, G, B, and K.

After the use amount of K ink is set in S112 of FIG. 3, the color conversion table generation device 100 sets the use amount of CMY ink, generates the color conversion table 400 illustrated in FIG. 18 (S114), and ends color conversion table generation processing. When the use amount of CMY ink is set in the predefined axis A0, the use amount of CMY ink can be determined similarly to the case of K ink. The color conversion table 400 illustrated in FIG. 18 is information representing a correspondence relationship between coordinate values (C1j, M1j, Y1j, and K1j) of CMYK color space (input color space CS1) which depend on the input device and coordinate values (C2j, M2j, Y2j, and K2j) of CMYK color space (output color space CS2) which depend on the output device. The coordinate values (C1j, M1j, Y1j, and K1j) represent the amount of the CMYK color. The coordinate values (C2j, M2j, Y2j, and K2j) represent the use amount of CMYK ink. The variable j is a variable identifying each grid point GD0 corresponding to the coordinate of the input color space CS1. The output coordinate values (C2j, M2j, Y2j, and K2j) are defined so that the ink ejection amount falls within the range of the ink amount upper limit UL. As illustrated in FIG. 18, when the input coordinate values (C1j, M1j, Y1j, and K1j) are correlated with the output coordinate values (C2j, M2j, Y2j, and K2j), the color conversion table 400 in which the correspondence relationship for each grid point GD0 is defined can be generated.

The generated color conversion table 400 is incorporated into, for example, a printer driver (not illustrated). A print control device realized by the printer driver generates output data representing the coordinate values (C2q, M2q, Y2q, and K2q) of output color space CS2 from printing data which represents the coordinate values (C1q, M1q, Y1q, and K1q) of input color space CS1 with reference to the color conversion table 400. When the piece of output data is transmitted to the printing device 200, the printing device 200 prints the image IM2 in the print substrate 290 based on the piece of output data and forms a printed matter PT2.

As described above, when the user sets the occurrence position (420) at which use of K ink is started in each of the ridgeline axis A0w, A0c, A0m, A0y, A0r, A0g, A0b, and A0k provided in the input color space CS1, it is determined whether K ink is to be used or not also in the grid points GD2 at positions except for the ridgeline axis A0w, A0c, A0m, A0y, A0r, A0g, A0b, and A0k among the input color space CS1. With this, the user does not need to set whether K ink is to be used or not, for all grid points GD0. In a case where, it is determined that K ink is to be used at the grid point GD2 located at the position except for the predefined axis A0, the use amount of K ink at the position located at the grid point GD2 of the input color space CS1 is set. Accordingly, also, in the present specific example, it becomes possible to easily generate a color conversion table improving image quality of a print image.

Furthermore, the predefined axis A0 is not limited to eight ridgeline axes and thus interpolation is not limited to interpolation of a hexahedron.

7. MODIFIED EXAMPLE

Various modified examples of the present invention may be considered.

For example, the kind of ink is not limited to the CMYK and may include Lc, Lm, Dy, Or, Gr, Lk, a non-colored color material for image quality improvement, and the like, in addition to the CMYK. The present technique can also be applied to a case where ink of some of the CMYK is not used.

Processing described above may be suitably modified, for example, in such a way that sequential order thereof is changed.

The screen in which a boundary position, at which use of the specific color material is started or ended, is set is not limited to the screens illustrated in FIGS. 5 and 15. Also, the screen in which the function used for setting the use amount of the specific color material is set is not limited to the screens illustrated in FIGS. 6 and 16. In the following, an example of the screen in which the ink occurrence end position (an example of boundary position) is set and an example of the function setting screen at the time of setting the ink occurrence end position will be described. As a premise, it is assumed that the printing device 200 uses CMYK ink and Lk ink and Lk ink is a specific color material.

FIG. 20 schematically illustrates an example of an occurrence end position setting screen displayed when the occurrence end position setting tab 621 is operated. FIG. 21 schematically illustrates an example of a function setting screen at the time of setting the occurrence end position displayed when the function setting tab 671 is operated at the time of setting the occurrence end position. Same reference numerals are given to the same points as those in the screens illustrated in FIGS. 5 and 6, and detailed description thereof will be omitted.

An occurrence end position setting screen 630 illustrated in FIG. 20 is the same screen as the occurrence end position setting screen 610 illustrated in FIG. 5. The slider control 612 of FIG. 20 is an operation unit for collectively setting the set values that represent respective ink occurrence end positions of seven axes included in the predefined axis A0. The detailed setting input field 613 illustrated in FIG. 20 is an operation unit for individually setting the set values that represent the ink occurrence end positions of seven axes included in the predefined axis A0. A function setting screen 680 at the time of setting the occurrence end position illustrated in FIG. 21 is the same screen as the function setting screen 660 illustrated in FIG. 6 except that the function displayed in the function display field 665 is a decreasing function.

Color conversion table generation processing of the present modified example also can be performed according to color conversion table generation processing illustrated in FIG. 3. When color conversion table generation processing is started, the color conversion table generation device 100 receives selection of printing setting (S102), sets the ink amount upper limit UL (S104), displays the occurrence end position and the function setting screen on the display device 115 (S106), and sets the ink occurrence end position and the function 460 (S108). When an operation of the save button 614 by the input device 116 is received in the occurrence end position setting screen 630 illustrated in FIG. 20, the color conversion table generation device 100 stores the set values of the seven axes according to the operation received in the input field 613 or by the slider control 612, and causes processing to proceed to S110 of FIG. 3. That is, the color conversion table generation device 100 receiving setting in the occurrence end position setting screen 630 receives setting of the occurrence end position at which use of Lk ink is ended for each of the axis A0c, A0m, A0y, A0gray, A0r, A0g, and A0b provided in the input color space CS1.

When an operation of the save button 666 by the input device 116 is received in the function setting screen 680 at the time of setting the occurrence end position illustrated in FIG. 21, the color conversion table generation device 100 stores the set values representing functions 461, 462, 463, . . . of the seven axes according to the operations received in the selection fields 662 and 663 and by the slider control 664, and causes processing to proceed to S110 of FIG. 3. That is, the color conversion table generation device 100 receiving setting in the function setting screen 680 receives setting of the function 460 used in setting the use amount of Lk ink.

Thereafter, the color conversion table generation device 100 sets the use amount of CMYK ink, generates the color conversion table (S114), and ends the color conversion table generation processing.

Thus, the user does not need to set whether Lk ink is to be used or not, for all grid points GD0. In a case where, it is determined that Lk ink is to be used at the grid point GD2 located at the position except for the predefined axis A0, the use amount of Lk ink at the position located at the grid point GD2 of the input color space CS1 is set. Accordingly, also, in the present modified example, it becomes possible to easily generate a color conversion table improving image quality of a print image.

8. CONCLUSION

As described above, according to the present invention, it is possible to provide a technique, which easily generates a color conversion table improving image quality of an output image, or the like, by various aspects. Furthermore, basic effects described above may be obtained by a technique consisting only of constitutional elements relating to independent claims, or the like.

Also, it is possible to embody a configuration in which constitutional elements disclosed in the examples described above are replaced with each other or a combination of the constitutional elements is changed, a configuration in which constitutional elements disclosed in a known technique or the examples described above are with each other a combination of the constitutional elements is changed, or the like. The present invention also includes these configurations.

This application claims priority under 35 U.S.C. § 119 to Japanese Patent Application No. 2016-167621, filed Aug. 30, 2016. The entire disclosure of Japanese Patent Application No. 2016-167621 is hereby incorporated herein by reference.

What is claimed is:

1. A color conversion table generation device that generates a color conversion table defining a correspondence relationship between a coordinate value of input color space and a use amount of a plurality kinds of color materials used for printing, the device comprising:
a processor that receives selection of settings of boundary positions at which use of a black color material included in the plurality kinds of color materials is started or ended in achromatic and chromatic axes provided in the input color space, respectively,
the processor determining whether the black color material is to be used at a grid point defining the correspondence relationship or not, based on a positional relationship between the grid point and the boundary positions in the achromatic and chromatic axes,
the processor setting a use amount of the black color material at the grid point in response to determining that the black color material is to be used at the grid point.

2. The color conversion table generation device according to claim 1,
wherein the processor uses a function which obtains a value representing a use amount of a color material from a value representing a position of the predefined axis and thereby to set the use amount of the black color material at the grid point.

3. The color conversion table generation device according to claim 2, wherein the processor receives selection of setting of a function used in setting the use amount of the black color material.

4. The color conversion table generation device according to claim 1,
wherein the predefined axis includes a plurality of axes selected from
a gray axis reaching a black point from a white point in the input color space,
an axis-via-Y reaching the black point by passing through a pure yellow color point from the white point in the input color space,
an axis-via-R reaching the black point by passing through a pure red color point from the white point in the input color space,
an axis-via-M reaching the black point by passing through a pure magenta color point from the white point in the input color space,
an axis-via-B reaching the black point by passing through a pure blue color point from the white point in the input color space,
an axis-via-C reaching the black point by passing through a pure cyan color point from the white point in the input color space, and
an axis-via-G reaching the black point by passing through a pure green color point from the white point in the input color space,
the processor receives selection of setting of the boundary position for each of the plurality of axes, and
the processor determines whether the black color material is to be used at the grid point or not, based on the boundary position in each of the plurality of axes.

5. The color conversion table generation device according to claim 4,
wherein the predefined axis includes a first selection axis, a second selection axis, and a third selection axis selected from among the gray axis, the axis-via-Y, the axis-via-R, the axis-via-M, the axis-via-B, the axis-via-C, and the axis-via-G, and
the processor determines whether the black color material is to be used at the grid point or not, based on a positional relationship between a triangle, which connects the boundary position in the first selection axis, the boundary position in the second selection axis, and the boundary position in the third selection axis, and the grid point, in the input color space.

6. The color conversion table generation device according to claim 5,
wherein the third selection axis is the gray axis, and
in a case where the processor determines whether the grid point is included in a tetrahedron, which is formed by using pure color points that the first selection axis passes through, pure color points that the second selection axis passes through, the white point, and the black point as vertices, in the input color space or not and it is determined that the grid point is included in the tetrahedron, the processor determines whether the black color material is to be used at the grid point or not based on the positional relationship between the triangle and the grid point.

7. The color conversion table generation device according to claim 5,
wherein the processor sets the use amount of the black color material at the grid point, based on the positional relationship between the triangle and the grid point, in the input color space.

8. A color conversion table generation device that generates a color conversion table defining a correspondence relationship between a coordinate value of input color space and a use amount of a plurality kinds of color materials used for printing, the device comprising:
a processor that receives selection of setting of a boundary position at which use of a specific color material included in the plurality kinds of color materials is started or ended in a predefined axis provided in the input color space,
the processor determining whether the specific color material is to be used at a grid point defining the correspondence relationship or not, based on the boundary position in the predefined axis,
the processor setting a use amount of the specific color material at the grid point in a case where it is determined that the specific color material is to be used,
wherein the input color space is color space including a one-dimensional axis of a first input color, a one-dimensional axis of a second input color, a one-dimensional axis of a third input color, and a one-dimensional axis of a fourth input color,
the predefined axis includes a plurality of ridgeline axes in the input color space, each ridgeline axis representing a locus when vertices of a virtual hexahedron configured with the one-dimensional axis of the first input color, the one-dimensional axis of the second input color, and the one-dimensional axis of the third input color are moved due to variation in components of the fourth input color,
the processor receives setting of the boundary position for each of the plurality of ridgeline axes, and
the processor determines whether the specific color material is to be used at the grid point or not, based on the boundary position in each of the plurality of ridgeline axes.

9. The color conversion table generation device according claim 8,
wherein the predefined axis includes eight ridgeline axes corresponding to eight vertices, respectively, in the virtual hexahedron, and
the processor determines whether the specific color material is to be used at the grid point or not, based on a positional relationship between the boundary position in each of the eight ridgeline axes and the grid point, in the input color space.

10. The color conversion table generation device according claim 9,
wherein the processor, sets the use amount of the specific color material at the grid point, based on the positional relationship between the boundary position in each of the eight ridgeline axes and the grid point, in the input color space.

11. A color conversion table generation method of generating a color conversion table defining a correspondence relationship between a coordinate value of input color space and a use amount of a plurality kinds of color materials used for printing, the method comprising:
receiving, by a processor, selection of settings of boundary positions at which use of a black color material included in the plurality kinds of color materials is started or ended in achromatic and chromatic axes provided in the input color space, respectively;
determining, by the processor, whether the black color material is to be used at a grid point defining the correspondence relationship or not, based on a positional relationship between the grid point and the boundary positions in the achromatic and chromatic axes; and setting, by the processor, a use amount of the black color material at the grid point in response to determining that the black color material is to be used at the grid point.

* * * * *